OUTPUT COUNTER-410

1

3,495,044

COMMON CONTROL TELEPHONE SYSTEM USING TONE AND DIAL SIGNALING

Donald E. Denman, Elida, Ohio, assignor, by mesne assignments, to C. P. Clare & Company, Chicago, Ill., a corporation of Delaware Filed Aug. 25, 1966, Ser. No. 575,125
Int. Cl. H04m 3/56
U.S. Cl. 179—18 19 Claims

ABSTRACT OF THE DISCLOSURE

A common control for a telecommunication switching system includes a register sender automatically adapted for control by either incoming dial or multi-frequency signals. The register sender stores incoming digits in a group of storage stages associated with translating or control networks which respond to one or more of the stored digits to provide at least one additional digit stored in at least one additional storage stage. The sender always first transmits at least one of the additional digits regardless of the type of service or nature of the incoming call involved.

This invention relates to a communication system and, more particularly, to a register sender control for a telecommunication system.

The common control of a telecommunication system afforded by the use of register senders or directors and related translating equipment possesses substantial and acknowledged system operating advantages. Included among these are uniform directory number dialing to all points in an extended area service (EAS) network, acceptance of degraded input pulses, full use of bank levels and trunk circuits, elimination of ranks of selectors, and the flexibility to provide a large range of additional services as they are required. With the growing demand for, or, in some instances, the necessity of supplying services in offices lacking common control but possessing switching equipment with many remaining years of service, it would be desirable to provide a common control unit which is adapted for use with existing switching equipment and capable of supplying all of the services and operating features provided in systems initially designed for common control operation.

Such a common control unit or register sender must be capable of operation with existing step-by-step, crossbar, or relay switching equipment without requiring either substantial modification of this equipment or excessive interface equipment. Further, because such units preferably must be located in existing physical plants, the size of the unit must be as small as possible. In addition, the complexity of the units must be reduced as much as possible consistent with providing the additional service features desired, but the design of the units must be flexible enough to permit a basic unit to be used in fifty line CDO's as well as, with modular additions, in ten thousand line MDO's. These switching units should possess the usual desirable characteristics of being as maintenance free as possible and of being capable of maintenance by present personnel.

Accordingly, one object of the present invention is to provide a new and improved common control telecommunication system.

A further object is to provide a register sender for a common control telecommunication system consisting of sealed magnetic switch elements which possess stable operating characteristics over a virtually unlimited time span and which are substantially immune to adverse operating environmental conditions.

2

A further object is to provide a register sender capable of being manufactured as groups of printed circuit boards which reduce the size of the register sender and which permit a modular approach to changes in the capacity of the unit.

A further object is to provide a register sender including apluralty of register stages and new and improved circuits for storing the data in and transmitting data from the register stages.

A further object is to provide a register sender including a group of register stages and new and improved means for controlling the flow of data between the register stages and related translating and coding units.

Another object of the present invention is to provide a telecommunication system including a new and improved means for storing data in a plurality of register stages under the control of incoming tone and dialed signals.

Another object is to provide a common control telecommunication system including new and improved means for effecting service features, such as operator intercept.

Another object is to provide a register sender including new and improved means for controlling digital transmission from the register sender in dependence on the ability of the outgoing signaling path to receive switch directing signals.

Another object is to provide a register sender including new and improved magnetic switching means for controlling the outpulsing of coded information.

Many other objects and advantages of the present invention will become apparent from considering the following detailed description in conjunction with the drawings in which:

FIGS. 1–4 form a schematic diagram of a telecommunication system which uses register-sender common control and which embodies the present invention;

Figures 1, 10:
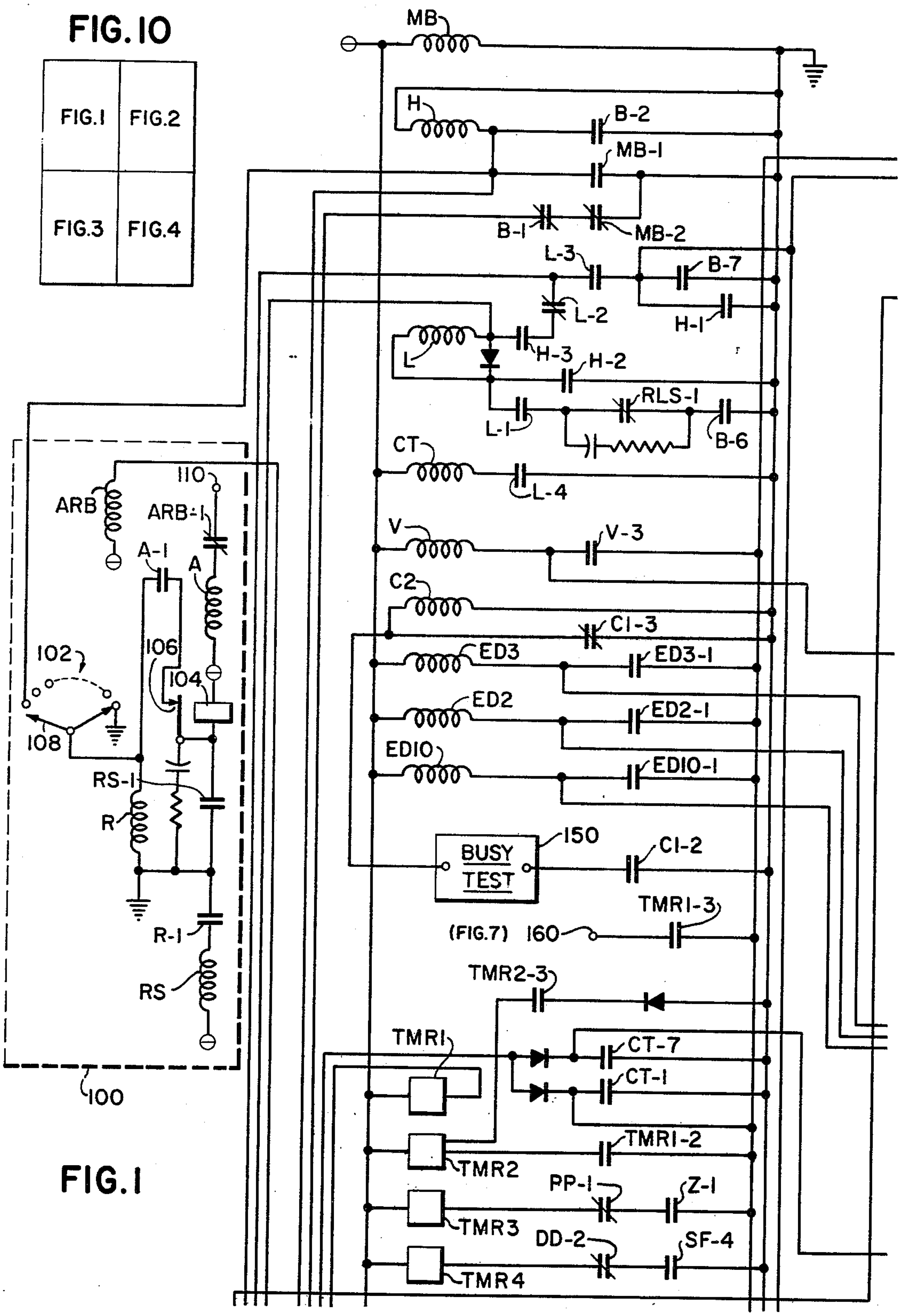
FIG. 10 is a diagram indicating the manner in which FIGS. 1–4 of the drawings are placed adjacent each other to form a schematic diagram of the telecommunication system.

Referring now more specifically to FIGS. 1–4 of the drawings, therein is illustrated a telecommunication or telephone system provided with a register sender common control which embodies the present invention. The conventional components of a telephone system are shown in block form in conjunction with the details of the register sender embodying the present invention. Although the drawings illustrate the details of only a single register sender, traffic requirements in most systems are such as to require a plurality of register sender units similar to that shown in FIGS. 1–4 of the drawings.

The telephone or telecommunication system is shown very briefly in schematic form and includes a calling station 302 (FIG. 3) which is adapted to be connected through a prior switch train 304 to an adapter circuit 301 which provides the interface between existing switching equipment and the illustrated register sender. This adapter circuit 301 also provides an interface between the outgoing signaling channel from the register sender and a representative called station 308 which is reached by supplying switch directing signals to a subsequent switch train 306. The switching units 304 and 306 can comprise step-by-step, crossbar, or relay switching equipment of any of the known constructions. Frequently, the prior switch train 304 will comprise a finder switch and associated controls which connect the calling station 302 to the adapter circuit 301. The adapter circuit 301 is conventional in design and generally requires nothing more than a pair of relays.

When a connection is extended from the calling station 302 through the switch train 304 to the adapter circuit 301, a start signal is supplied to a register assigner 100 which is of conventional design and which operates to allocate an idle one of a plurality of register senders to the seized adapter circuit 301. A finder switch 310 individual to the illustrated register sender is placed in operation under the control of the register assigner 100 to associate the allotted register sender with the adapter circuit 301 requiring service.

When this association has been completed, dial tone is returned to the calling station 302, and the digits supplied by the calling station 302 are stored in a selected group of digit storage units in a data storage unit 240 under the control of a write sequence counter 220. The write sequence counter 220 insures that the received digits are stored in a predetermined order in various digit storing stages of the data storage unit 240 in dependence on the number of digits received from the calling station 302.

If digital information is received from the calling station 302 in the form of trains of dial pulses, the dial pulses are counted in an input counter 200 and their value supplied in 2 of 5 marking through the write sequence counter 220 for storage in selected storage stages of the data storage unit 240. Alternatively, if class of service marking is received from the adapter circuit 301 indicating that digital information is to be supplied by tone signaling, a finder switch 212 couples a tone signal receiver 210 between the input to the write sequence counter 220 and the adapter circuit 301 so that digital information is supplied to the data storage unit 240 by tone signaling. The register sender is so arranged that if dial signals are received when the system is conditioned to receive tone signaling, the tone receiver 210, which is common to a group of register senders, is released, and the input counter 200 is used to supply the input to the data storage unit 240.

When a predetermined number of digits, commonly three code digits, have been stored in the data storage unit 240, the values of these digits are read into a routing director coder 230 of conventional design in which these digits are translated to determine the type of switch directing signals that must be supplied to the subsequent switch train 306. As an example, the translated digits can indicate that the connection is to be extended to different types of toll facilities, satellite or local offices, or special service or operator trunks. As a result of this translation, the coder 230 must store at least one digit in a register stage in the unit 240 which always stores the first digit applied to the subsequent switch train. The coder 230 may supply additional digits to other register stages that are not included in the group in which received digits are stored. The coder 230 also supplies special instructions relating to the number of digits to be outpulsed, the location of the digits in the storage unit 240 which are to be transmitted, and the requirement for use of a number group translator coder 250. When this information has been supplied to and stored in the data storage unit 240 or the register sender by the routing director coder 230, which coder is common to all of the register senders in a group, the coder 230 is released.

As soon as a digit is stored in the register stage that must always contain the lrst digit to be transmitted, a read sequence counter 400 renders an output counter 410 effective to start the transmission of the first digit. As each digit is outpulsed to the subsequent switch train 306 by the output counter 410, the read sequence counter 400 is advanced under the control of the instructions previously provided by the coder 230 to select the next digit for transmission.

In the event that the routing director coder 230 indicates the necessity for number group translation, the register sender, upon completion of the storage of the received directory number, transfers the values of the received directory number other than the code digits to the input of the coder 250. This coder returns translated digits to storage in the data storage unit 240 in stages not occupied by the digits from the coder 230 or the digits received from the calling station 302. The coder 250 also supplies instruction to the read sequence counter 400 to delete or skip the directory digits received from the calling station 302. These translating operations take place during the outpulsing of the prior digits required for the connection, and the transfer of the necessary data to the data storage unit 240 causes the release of the coder 250. When all of the necessary digits have been transmitted by the output counter 410, the register sender is cleared and released.

The register sender also includes means for detecing an abnormality in the subsequent switch train 306 and for automatically terminating digit transmission from the register sender until the abnormality is cleared. Alternatively, if the abnormality persists, the register sender is subjected to an enforced release operation. The register sender also includes provisions for directly initiating outpulsing operations without requiring the use of either of the coders 230 and 250 by examining the value of a digit stored in a selected one of the register stages of the data storage unit 240 during the reception of digital information from the calling station 302.

The details of the register sender are illustrated in FIGS. 1–9 of the drawings in detached contact form in which a pair of parallel lines represent a pair of normally open contacts, and a pair of spaced parallel lines intersected by a diagonal line represent a pair of normally closed contacts. With the exception of a few switching units, such as stepping switches, all of the relays in the register sender comprise sealed magnetic reed switches of a known construction which normally provide open contacts and which, by the application of permanent magnet bias, provide normally closed contacts. Certain of the switches are sealed mercury contact switches which have greater current interrupting capabilities. The sealed switches are disposed in operating windings having one or more coils providing fields of similar or opposite polarity. These sealed switches have virtually unlimited life and are free of contact deterioration so that maintenance requirements are very low. In addition, the small size of these relays reduces the size of the register sender and makes possible the use of printed circuit boards and their advantages. In addition, these relays require much less power than telephone type relays and possess faster operating times which tend to reduce holding time.

Each relay in the circuit diagram of FIGS. 1–4 is designated by an alphabetical or alpha-numeric code, and the contacts controlled by the relay are designated by the same alphabetical or alpha-numeric code to which is added a dash and a suffix digit designating the number of the contact on the relay. As an example in FIG. 1, a relay R in the register assigner 100 includes a pair of normally closed contacts R–1. As a further example, a relay LI (top of FIG. 3) includes a pair of operating windings as well as a pair of normally open contacts LI—1 (top of FIG. 2) and a pair of normally closed contacts LI–2.

In the normal condition of the register sender, the operating winding of a main battery relay MB is connected directly between ground and grounded negative battery so that this winding is energized whenever power is supplied to the register sender. When the winding of the relay MB is energized, a pair of contacts MB–1 are opened and a pair of contacts MB–2 are closed. These contacts are shown in FIG. 1 of the drawings in their operated state. The opening of the contacts MB–1 removes a ground shunt from the operating winding of a hunt relay H and also removes ground from the bank of a stepping switch 102 in the register assigner 100 to mark the illustrated register sender as idle in the banks of the switch 102. The closure of the contacts MB–2 forwards ground through a pair of normally closed contacts B–1 and a pair of normally closed contacts 322 on a busy switch 320 individual to the illustrated register sender to energize the winding of an all-registers-busy relay ARB. The relay ARB, which is connected to all of the available register senders, is maintained in an operated condition so long as at least one register sender is available for assignment. The energization of the winding of the relay ARB closes a pair of contacts ARB–1 to connect the winding of a relay A in the register assigner 100 to a start terminal 110. The contacts ARB–1 are shown in a normally closed condition since the illustrated register sender is assumed to be available for use.

Assuming that a call is to be extended from the calling station 302, the call is extended from the calling station 302 through the switch train 304 to the adapter circuit 301 which provides an interface between the conventional switch train and the register sender. When the incoming switch train is extended to the adapter circuit 301, for instance, a start ground signal is applied to the terminal 110 in the register assigner 100 indicating the need for the assignment of an idle register sender to the connection. The start signal energizes the winding of the relay A in the register assigner 100 so that a pair of normally open contacts A–1 are closed. This connects the operating winding of a motor magnet 104 for the switch 102 to a wiper 108 in the switch 102 through a pair of normally closed interrupter contacts 106. If the wiper 108 is in a position assigned to a busy register sender, ground is applied to the bank contact individual to this register sender, as illustrated schematcally in FIG. 1, and a circuit is completed for energizing the motor magnet 104. The energization of the motor magnet 104 opens the contacts 106 and advances the wiper 108 a single step. Assuming that the illustrated register sender is the next sender available for assignment and is in an idle condition, negative battery is forwarded over a circuit including the contacts 106 and A–1, the wiper 108, and the bank contact individual to the illustrated register sender to one side of the operating winding of the relay H. The other winding of this relay is connected to ground. This circuit does not operate the motor magnet 104 but energizes the winding of the relay H sufficiently to operate this relay.

In operating, the relay H closes three pairs of contacts H–1, H–2, and H–3. The closure of the contacts H–1 provides a source of latching ground for the counters 200, 220, and 400. This ground is also forwarded through a plurality of closed contacts INT–1, DS–2, and 324 to start a timer TMR1. The closure of the contacts H–2 connects one side of the winding of a line relay L to ground, and the closure of the contacts H–3 connects the other side of the winding of this relay through a pair of normally closed contacts L–2 on the relay L to a wiper 312 which is one of six wipers 311–316 on the finder switch 310 for associating the illustrated register sender with the adapter circuits in the system, such as the adapter circuit 301. The terminal of the winding of the relay L that is connected to the wiper 312 is also connected to negative battery over a pair of normally closed interrupter contacts 318 and the winding of the motor magnet 317 for the finder switch 310. The relay L controls the operation of the finder switch 300 to associate the register sender with the adapter circuit 301 requiring the use of a register sender.

More specifically, the adapter circuit 301 is marked in the contact bank engaged by the wiper 312 by an open circuit while the remaining similar adapter circuits are marked by the presence of ground on the contacts of the bank engaged by the wiper 312. Thus, a shunting ground source is continuously applied to one terminal of the relay L so that the relay L is shunted down. The ground applied to the winding of the motor magnet 317 through the interrupter contacts 318 intermittently operates the motor magnet 317 so that the wipers 311–316 are advanced step-by-step in the search of the calling adapter circuit. When the wipers move to a position individual to the calling adapter circuit 301, the ground shunt for the relay L is removed, and this relay operates from the battery supplied through the winding of the motor magnet 317.

When the relay L is operated, the contacts L–2 are opened, and three additional pairs of normally open contacts L–1, L–3, and L–4 are closed. The opening of the contacts L–2 disconnects the winding of the relay L from the wiper 312, and the closure of the contacts L–3 coupled with the prior closure of the contacts H–1 applies ground to the wiper 312 to forward ground to the adapter circuit 301 indicating that the assignment of a register sender has been completed. The closure of the contacts L–1 prepares a holding circuit for the relay L, and the closure of the contacts L–4 completes an obvious circuit for energizing the winding of a cut-through relay CT.

The operation of the cut-through relay CT closes seven pairs of normally open contacts CT–1 to CT–7. The closure of the cotnacts CT–3 connects the wiper 311, which receives a class of service ground mark when the tone receiver 210 is to be used, to the winding of a relay G. The closure of the contacts CT–1 provides a source of main holding ground for the register sender. This ground is forwarded through a pair of normally closed contacts Y–5 to operate a relay PCI (FIG. 4) so that it closes a pair of contacts PCI–1 to prepare an operating circuit for a parity check relay PC. The closure of the contacts CT–7 provides a source of latching ground for the data storage unit 240. The closure of the contacts CT–2 and CT–6 connects the outgoing tip and ring conductors from the illustrated register sender through the wipers 315 and 316 of the finder switch 310 to the adapter circuit 301. When the cut-through relay CT interconnects the outgoing tip and ring conductors with the register sender, one winding of a relay SX is connected across the outgoing line over a circuit including either of a pair of normally closed contacts PI–1 or SB–2. The energization of this winding of the relay SX operates the relay to close two pairs of normally open contacts SX–1 and SX–2 and to open a normally closed pair of contacts SX–3. The closure of the contacts SX–1 completes a circuit for energizating another winding of the relay SX over a circuit including a pair of normally closed contacts Y–5. The other contact operations do not perform any useful functions at this time.

Figure 2:
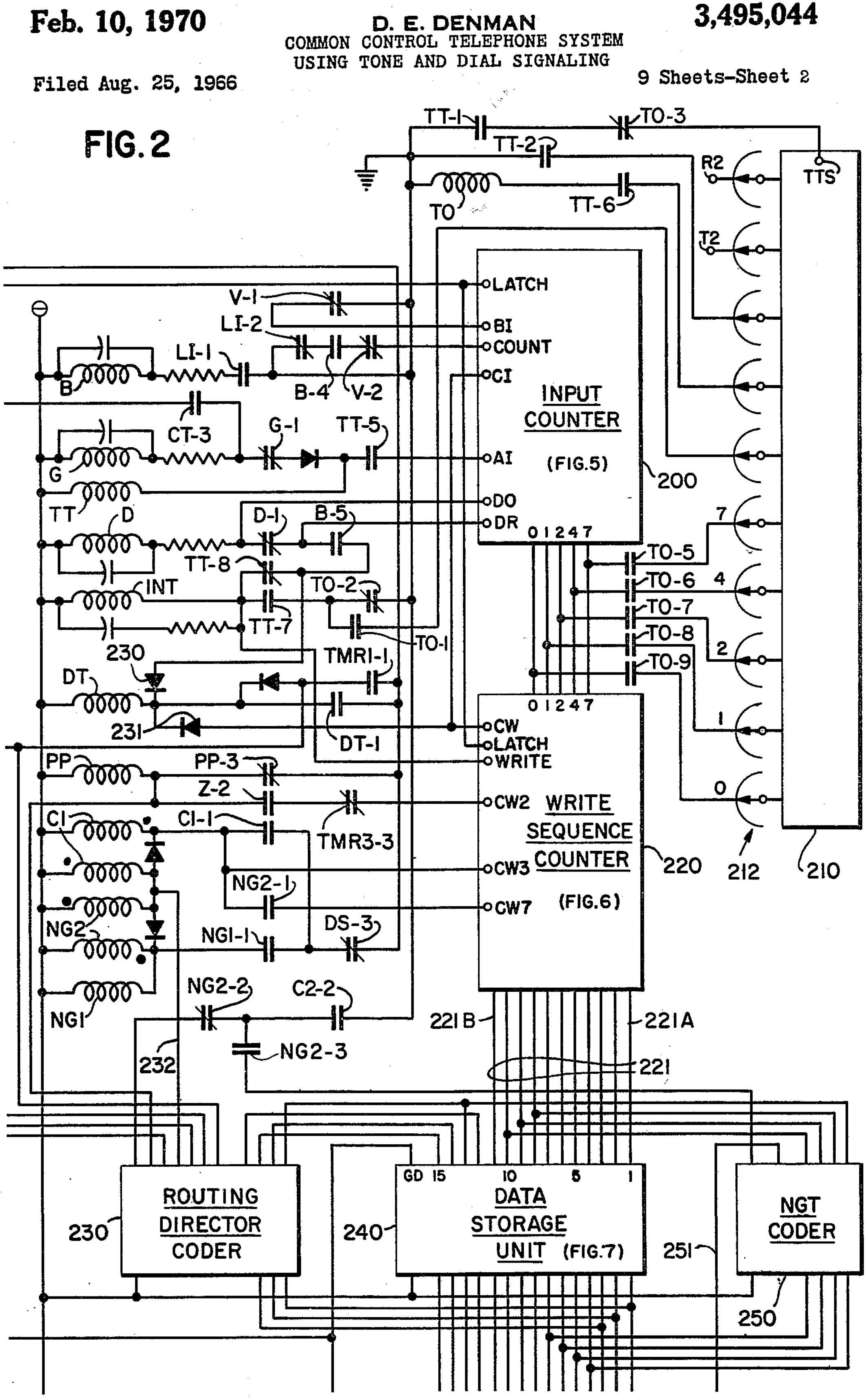

The closure of the contacts CT–4 and CT–5 connects the incoming tip and ring conductors of the signaling path from the adapter circuit 301 over the wipers 313 and 314 to ground and negative battery, respectively, through two windings of the relay LI and two series connected windings of a choke 330. This energization of the two windings of the relay LI closes the normally open contacts LI–1 and opens the normally closed contacts LI–2 (FIG. 2). The closure of the contacts LI–1 completes an energizing circuit for the winding of a slow-to-release relay B. This operates the relay B to open the contacts B–1 and to close six pairs of normally open contacts B–2 to B–7. The opening of the contacts B–1 removes one source of ground from the winding of the relay ARB in the register assigner to indicate that the illustrated register sender is in use. The relay ARB remains operated so long as at least one register sender remains in an idle condition. The closure of the contacts B–2 connects ground to the other terminal of the winding of the relay H and releases this relay. The closure of the contacts B–2 also supplies direct ground to the wiper 108 of the stepping switch 102 in the register assigner 100 so that the stepping switch 102 is advanced from the setting individual to the illustrated register assigner which has now been associated with the calling adapter circuit 301. When the relay H is released, the contacts H–1, H–2, and H–3 are opened. The opening of these contacts does not affect the register sender since the closed contacts B–7 provide a source of latching ground to replace that removed by the opened contacts H–1. The closure of the contacts B–6 provides a source of holding ground for the relay L to replace that removed by the opened contacts H–2. The closure of the contacts B–4 prepares a pulsing path extending to a count terminal of the input counter 200, and the closure of the contacts B–5 prepares an operating circuit for a dial tone relay DT and an interrupter relay INT.

The closure of the contacts B–3 connects a dial tone generator 340 to the tip conductor extending to the calling station 302 to provide an audible indication to the calling subscriber that the dialing of the digits necessary to extend the call can now be initiated. More specifically, the circuit completed by the closure of the contacts B–3 extends from the dial tone generator 340 through a coupling capacitor 341 and a plurality of closed contacts DT–2, TT–3, B–3, and CT–4 to the wiper 313.

The subscriber at the calling station 302 now initiates the transmission of the digits for selecting the called station 308. If the digits are transmitted as trains of dial impulses, the continuity of the tip-ring circuit is interrupted at the leading edge of the first dial impulse and releases the relay LI so that the contacts LI–1 are opened and the contacts LI–2 are closed. The relay B does not release because its slow-to-release characteristic is sufficient to bridge the open circuit period in a dial impulse. Thus, the contacts B–4 remain closed so that a ground count signal is supplied to the count input of the input counter 200 over a circuit including the closed contacts LI–2 and B–4 and a pair of normally closed contacts V–2.

This ground impulse applied to the count terminal of the input counter 200 (FIG. 5) is forwarded through a diode 511 to energize the winding of a relay 510 which includes only a single pair of normally open contacts 510A. The energization of the winding of the relay 510, which winding is shunted by a slow-to-release timing network 512, closes the contacts 510A. The closure of the contacts 510A connects the winding of a relay 520 to the ground applied to the latch terminal, and this ground, coupled with the ground forwarded from the count terminal through a diode 512, operates the relay 520 to close a pair of contacts 520A and to open a plurality of normally closed contacts 520B and 520C. The closure of the contacts 520A completes an energizing circuit for the winding of a relay 530, which winding is shunted by a slow-to-release network 531.

The energization of the winding 530 closes a pair of normally open contacts 530A which extend ground from the latch terminal through a pair of normally closed contacts 541D to an even latch conductor 571, this conductor also being supplied with ground through a diode 545 from the count terminal. The closure of the contacts 530A also prepares a circuit interrupted at a pair of open contacts 541C for extending ground to an odd latch conductor 572.

These two latching conductors 571 and 572 form part of a counting circuit 560 for counting dial pulses to determine the value of the dialed digit. The counting circuit 560 is substantially identical to the counting circuit shown and described in detail in the copending application of Wyman L. Deeg et al., Ser. No. 366,030, filed May 8, 1964, now Patent No. 3,327,177. The counting circuit

560 is advanced a single step by each ground impulse supplied to the count input terminal. The counting circuit 560 includes a bistable input circuit 540 which receives the input signals from the count terminal, a "0" stage 550, and ten counting stages which are provided by ten relays 561–570 representing the digits "1–9" and "0" or "10," respectively.

When the first ground pulse is applied to the count terminal, this pulse is forwarded through a pair of normally closed contacts 544D to one input of the flip-flop or bistable circuit 540 to energize a winding 544A and is also forwarded through a diode 543 to energize two additional windings 541B and 544B. The windings 544A and 544B are differentially wound, and their field commonly links the magnetic elements of two sealed magnetic switches affording the normally closed contacts 544D and a pair of normally open contacts 544C. Since both of the differential windings 544A and 544B are energized, the resultant field is small, and the status of the contacts 544C and 544D is not altered. The energized winding 541B is one of a pair of differential windings 541A and 541B linking the magnetic elements of the normally closed contacts 541D and a pair of normally open contacts 541C. Since only the winding 541D is energized, an unbalanced magnetic field is induced in the magnetic elements of these magnetic switches, and the contacts 541D are opened and the contacts 541C are closed. The closure of the contacts 541C coupled with the prior closure of the contacts 530A supplies holding ground to the odd latch conductor 572 and to the windings 541B and 544B to maintain energization of these two windings when the count pulse is removed from the count terminal to the input counter 200.

The ground pulse from the count terminal is also forwarded through the closed contacts 544D, a pair of normally closed contacts 550A controlled by the preliminary stage 550, and a diode 546 to energize the winding of the "1" relay 651. The energization of the winding of the relay 561 closes a plurality of contacts 561A–561D. The closure of the contacts 561A connects the winding of the relay 561 to the odd latch conductor 572 which is supplied with ground through the closed contacts 530A and 541C so that the relay 561 is held operated when the count pulse is terminated. The closure of the contacts 561B connects the winding of the next relay 562 to the open contacts 544C so that the relay 562 will be operated when the next count pulse is received. The closed contacts 561C and 561D connect the open contacts 520C to two out of five digit output or marking conductors representing the weights "0," "1," "2," "4," and "7" in accordance with a binary coded representation of the corresponding digit value "1." Thus, the contacts 561C and 516D are connected to the conductors assigned the weights "0" and "1" to provide a 2 of 5 code representing "1." Each of the output conductors is also coupled through a diode 581 to an output terminal C1.

The ground signal from the count terminal is also forwarded through the closed contacts 554D and 550A to a first winding 551A in a pair of differential windings 551A, 551B for the preliminary relay 550. The other differential winding 551B is also energized through a diode 548 and through a diode 547 connected to one terminal of the winding of the relay 561. Since both of the differential windings 551A and 551B are energized, an ineffective resultant magnetic field is applied to the magnetic elements of two sealed magnetic switches which form the normally closed contacts 550A and a pair of normally open contacts 550B, and these contacts remain in the position illustrated in FIG. 5 until the termination of the first input pulse.

When the first impulse in the first train of dial pulses terminates, ground is removed from the count terminal to the input counter 200, and the energizing circuit for the relay 510 is interrupted. However, this relay has a slow-to-release characteristic of around 140 milliseconds which is sufficient to bridge the separation between separate pulses in a digit representing train of dial pulses and does not release. The relays 520 and 530 remain operated over the holding circuits including the closed contacts 510A and 520A, respectively. The removal of ground from the count terminal terminates the energization of the winding 544A in the flip-flop 540, the winding 541B and 544B remaining energized over the holding circuit including the closed contacts 530A and 541C. With only the winding 544B energized, the switches controlled by the differential windings 544A, 544B are operated so that the contacts 544C are closed and the contacts 544D are opened. These contacts operate to steer the next count pulse to the opposite or reset input of the flip-flop 540 and to the even numbered counting stages.

The removal of the ground pulse from the count input also terminates the concurrent energization of both of the windings 551A and 551B in the preliminary stage or relay 550 of the counter. At this time, the diode 547 forwards ground from the closed contacts 561A to only the winding 551B, the diode 548 isolating the winding 551A from ground. Accordingly, the preliminary stage 550 is operated to open the contacts 550A and to close the contacts 550B. The closure of the contacts 550B completes a holding circuit for the winding 551B of the preliminary stage 550 to maintain this stage operated so long as ground is applied to the latch terminal of the counter 200 and the contacts 530A remain closed.

When the second ground pulse representing the second pulse in the train of dial pulses is applied to the count terminal, the energizing circuit for the winding 510 is again completed, and ground is applied to the even latch conductor 571 through the diode 545. The ground pulse provided at the count terminal is also forwarded through the closed contacts 544C and 561B and the diode connected in series therewith to energize the winding 562 so that the four normally open pairs of contacts 562A–562D associated therewith are closed. The closure of the contacts 562A completes a holding circuit for the winding of the relay 562 extending to the count terminal. The closure of the contacts 562B prepares an operating circuit for the third relay 563. The closure of the contacts 562C and 562D connects the open contacts 520C to the marking conductors representing the weights "0" and "2" to provide a 2 of 5 coded representation of the digit "2".

The ground pulse provided at the count terminal is also forwarded through the closed contacts 544C to energize the winding 541A and through the diode 542 to energize the windings 541B and 544B. Since both of the differential windings 541A and 541B are concurrently energized, the resultant field from these windings is negligible, and the contacts 541C and 541D controlled thereby are restored to their normal condition shown in FIG. 5. The closure of the contacts 541D applies holding ground to the even latch conductor 571 to maintain the "2" relay 562 operated at the end of the count pulse. The opening of the contacts 541C removes holding ground from the flip-flop 540 and from the "1" relay 561 so that this relay releases to restore its contacts to their normal condition. At the end of the count pulse, the windings 541A, 541B, and 544B in the flip-flop 540 are no longer energized, and, since the contacts 541C are now opened, the energization of all of the windings in the flip-flop 540 is terminated. Thus, the contacts 544C and 544D controlled by the windings 544A and 544B are restored to their normal conditions in which the contacts 544C are opened and the contacts 544D are closed. The closure of the contacts 544D prepares a circuit for steering the next count pulse 562B to the winding of the "3" relay 563 and also to the set or right-hand input of the flip-flop 540.

The counter 560 operates in the manner described above to count the number of impulses applied to the input counter 200 from the calling station 302 in the manner described above. Thus, at the end of the train of dial pulses, the relays 510, 520, 530, and 550 are operated together with a single one of the relays 561–570 representing the value of the dialed digit, ten pulses representing "0" in the usual manner. In addition, the flip-flop 540 will be in one of its two alternate states, depending on whether the received pulse train has an odd or even number of pulses. Thus, one of the pairs of contacts such as the contacts 561C, 561D; 562C, 562D will be closed to prepare ground marking circuits for two of the five output conductors in accordance with the 2 of 5 code representing the value of the received digit.

The receipt of the first dial pulse in a dial pulse train from the calling station 302 also controls the input counter 200 to effect other controlling operations in the register sender. More specifically, when the first dial impulse is received by the input counter 200, the ground pulse applied to the count terminal is forwarded through the closed contacts 544D and 550A and the diodes 546 and 547 to be applied to an output terminal DO. The ground initially applied to the terminal DO is maintained throughout the counting of the pulse train by the contacts 550B which are closed at the end of the initial input pulse when the preliminary stage 550 is operated. The ground signal from the terminal DO (FIG. 2) is forwarded through the closed contacts D–1 and B–5 and a diode 230 to energize the winding of a dial tone relay DT. The energization of the winding of the relay DT closes a pair of normally open contacts DT–1 to complete a holding circuit for the relay DT and opens the normally closed contacts DT–2 (FIG. 3) to disconnect the dial tone generator 340 from the tip conductor of the extended switch train. Thus the receipt of the first impulse from the calling station 302 terminates the application of dial tone to the connection.

The ground signal provided at the terminal DO is also forwarded through the closed contacts D–1 and B–5 and a pair of normally closed contacts TT–8 to energize the winding of the interrupter relay INT, which relay is rendered slow-to-release by a shunting network. The energization of the winding of the relay INT opens the closed contacts INT–1 so that ground is removed from the first timer TMR1. Thus, the timer is disabled whenever a dial pulse is received indicating that operation of the register sender has been initiated.

The ground pulse at the terminal DO is also forwarded through the closed contacts D–1, B–5, and TT–8 to the write terminal of the write sequence counter 220. The write sequence counter 220 (FIG. 6) serves to direct the value of each successive digit stored in the input counter 200 to a separate one of a plurality of digit storage stages or units in the data storage unit 240. In general, the write sequence counter 220 is substantially identical to the counting circuit 560 in the input counter 200 and includes a counting circuit 600 comprising an input bistable circuit 610,( a preliminary stage 620, and eleven counting stages provided by eleven relays 621–631 corresponding to the maximum number of dialed digits expected from the calling station 302. The counter 600 can include a greater or lesser number of stages in dependence on the maximum number of digits that the register is designed to receive.

The counting circuit 600 operates in the same manner as the counting circuit 560 in the input counter 200 so that the receipts of the first ground pulse on the write terminal operates the bistable circuit 610 to a preliminary operated condition, prepares the preliminary stage 620 for operation, and operates the first counting relay 621 to close a plurality of normally open pairs of contacts 621A–621H. The ground pulse supplied to the write terminal also operates a slow-to-operate relay D to open the contacts D–1. This terminates the write pulse and permits the bistable circuit 610 to change to a fully operated condition and operates the stage 620. The opening of the contacts D–1 also interrupts the circuit for the relay INT which is slow-to-release. The operation of the bistable circuit 610 steers the next write pulse to the second counting relay 622.

The closure of the contacts 621A when the relay 621 is operated completes the holding circuit for the winding of the relay 621 extending to an odd latch conductor 650. The closure of the contacts 621B prepares an operating circuit for the second counting relay 622. The closure of the contacts 621D–621H connects the five coded output or digit marking conductors "0," "1," "2," "4," and "7" from the input counter 200 to a cable of five conductors 221A which extend to a digit storage unit in the data storage unit 240 in which is to be stored the value of the first digit transmitted from the calling station 302. In FIG. 2 of the drawings, the five conductors 221A are shown schematically as one of a cable group 221 interconnecting the data storage unit 240 with the input counter 200 through the write sequence counter 220. Each of the remaining counting relays 622–631 includes five corresponding contacts for connecting the common output terminals of the input counter 200 to ten different digit storage units in the storage unit 240 over individual groups of five conductors similar to the five conductors 221B for steering the eleventh digit received by the input counter 200 to the proper storage unit in the data storage unit 240 (see FIGS. 2 and 6).

Figure 6:
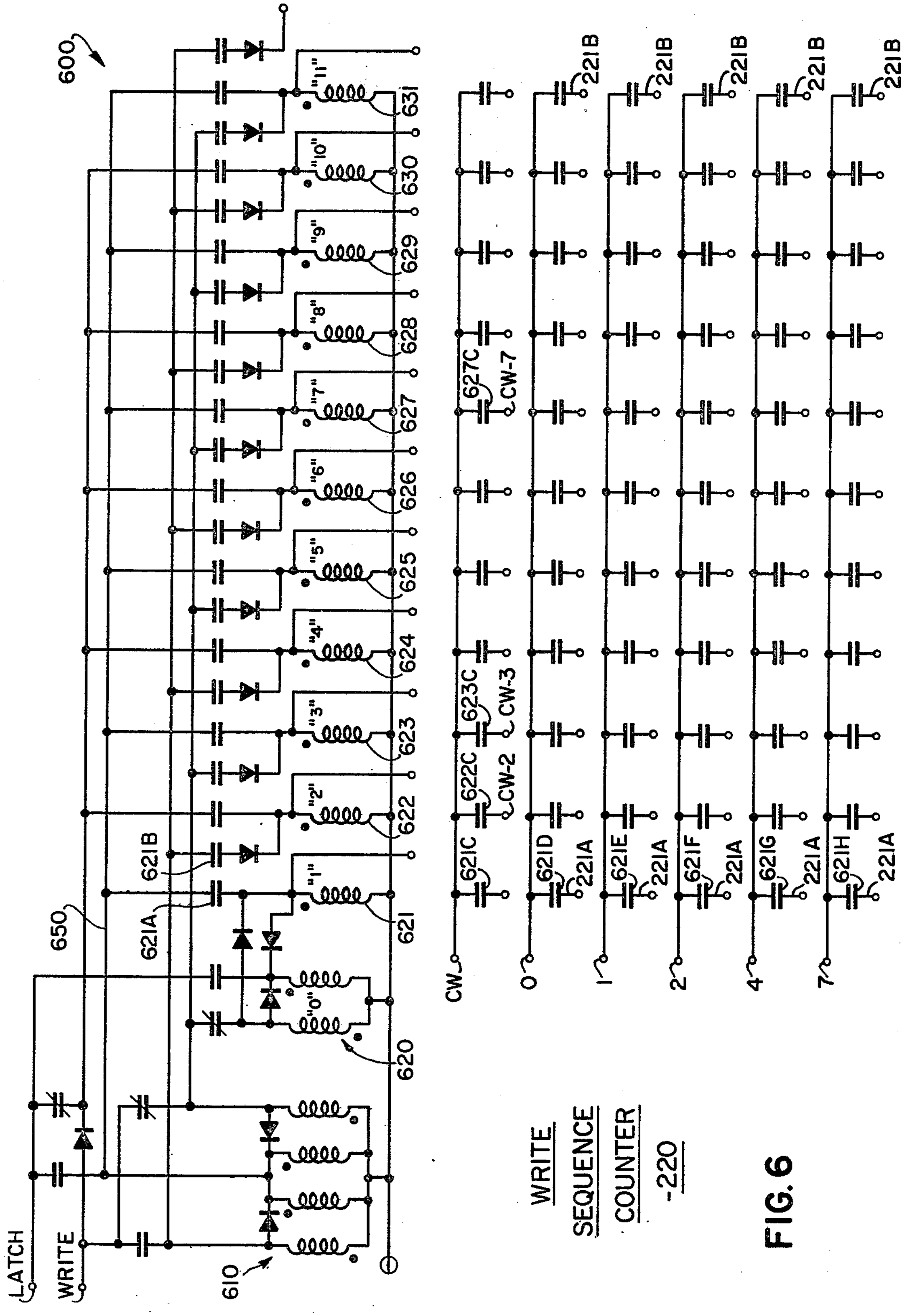
FIG. 6 is a schematic diagram of a write sequence counter forming a part of the register sender.

The write sequence counter 220 also includes a group of contacts which are operated in sequence as each successive digit is received by the input counter 200 to provide auxiliary control information representing the number of digitis received from the calling station. These auxiliary contacts are shown in FIG. 6 as contacts 621C, 622C, 623C, and 627C, for example. In the illustrated register sender, only the contacts 622C, 623C and 627C, which are operated incident to the receipt of the second, third, and seventh digits, are used to interconnect a terminal CW with one of three output terminals CW–2, CW–3, and CW–7.

Figure 7:
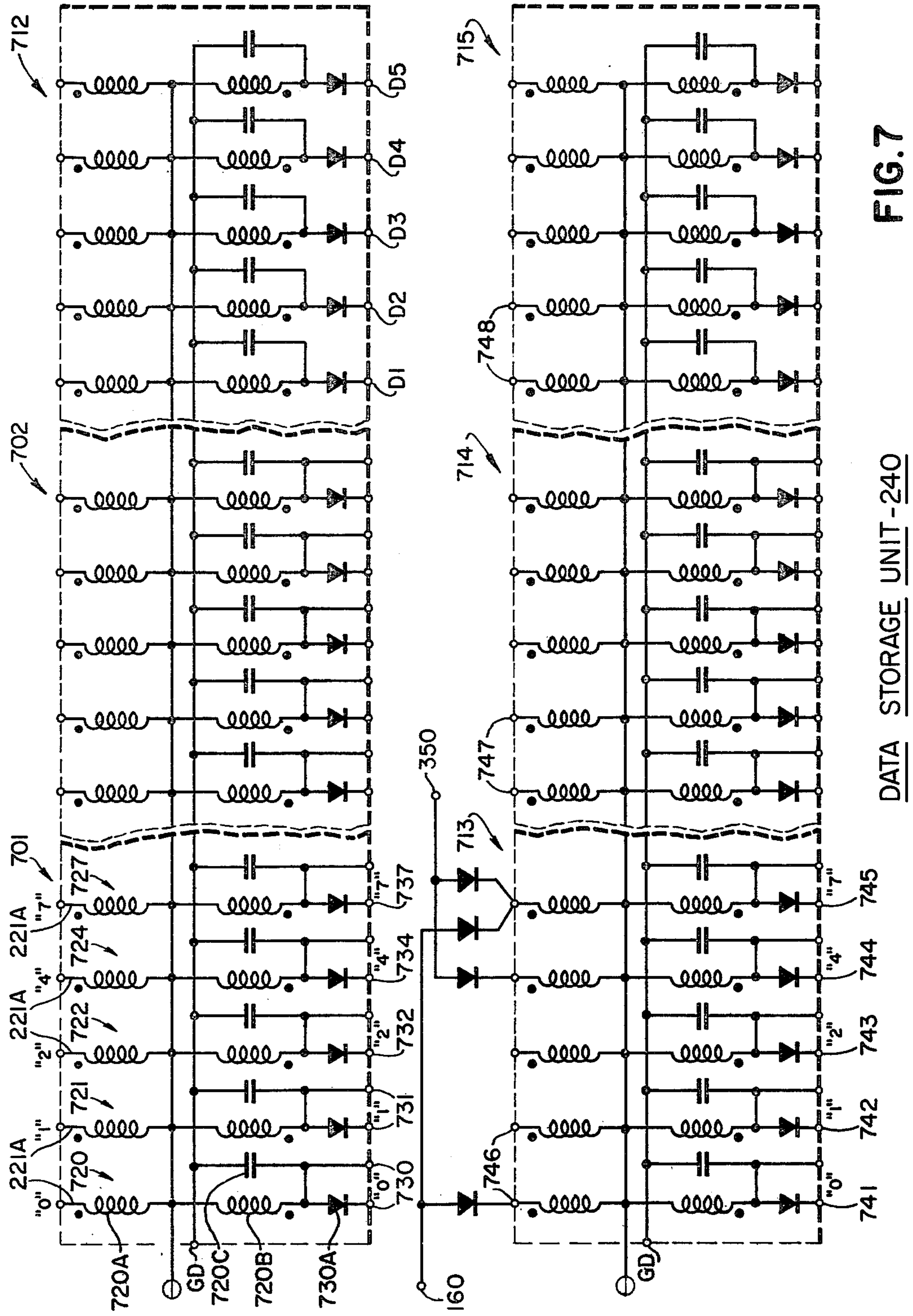
FIG. 7 is a schematic diagram of a data storage unit included in the register sender.

As indicated above, the data storage unit 240 includes a plurality of individual digit storage units. The data storage unit 240 is shown in FIG. 7 and, in the illustrated register sender, can include fifteen separate and identical digit storage units or stages 701–715, only six of which, 701, 702, and 712–715 are shown in FIG. 7. The first eleven digit storage units 701–711 can be supplied with digits for storage through the write sequence counter 220 under the control of digits transmitted from the calling station 302. The remaining four digit storage units 712–715 are selectively supplied with input information from the NGT coder 250 or the routing director coder 230. More specifically, the storage unit 712 receives digit delete information, and the storage units 713–715 receive three digits of routing or switch directing information.

Each of the digit storage units 701–715 comprises five storage relays similar to the five storage relays 720, 721, 722, 724, and 727 in the unit 701. Each of these storage relays includes a pair of operating windings, such as the pair of windings 720A and 720B for the relays 720, and a single pair of normally open contacts such as the pair of contacts 720C. To provide inputs to the digit storage units 701–715, one terminal of the input windings, such as the winding of the relay 720 in the unit 701, is connected to an external signal source. As an example, the storage unit 701 stores the first digit received from the calling station 302, and the input terminals to the five windings including the winding 720A are connected to the conductors 221A. Because of the 2 of 5 coding used throughout the register sender, only two of the windings will be energized at any given time. If the winding 720A, for instance, is energized, the contacts 720C are closed to apply ground to one terminal of the winding 720B to maintain this winding energized when the input signal is removed from the related winding 720A. Thus, the contacts 720C provide a holding circuit for the relay 720 extending to the switched ground terminal GD. In addition, the closure of the contacts 720C provides ground output signals at a pair of output terminals provided for each of the relays 720, 721, 722, 724, or 727. As an example, the closed contacts 720C forward ground directly to one output terminal 730 and through an isolating diode 730A to another output terminal 730. These output terminals are selectively connected to the routing director coder 230, the NGT coder 250, and the read sequence counter 400 in accordance with the use to which the related digital information is to be applied.

Referring back to the operations described above, at the end of the first pulse train representing the value of the first dialed digit, the relay LI remains operated during the interdigit interval, which interval is long enough to permit the release of the relay 510 (FIG. 5) in the input counter 200. When this releases, the contacts 510A are opened to release the relay 520 so that the contacts 520A are opened and the contacts 520B and 520C are closed. The opening of the contacts 620A does not effect the immediate release of the relay 520 because of the slow-to-release characteristic thereof. When the contacts 520C are closed, marking ground is forwarded through the two pairs of contacts maintained in a closed condition by the operated one of the ten counting relays 561–570. Assuming that the first pulse train consisted of two pulses, the relay 562 is in a closed condition so that the contacts 562C and 562D are closed. This means that the closure of the contacts 520C applies ground to the output conductors representing the weights "0" and "2." The ground applied to the "0" and "2" conductors is forwarded through the closed contacts 621D and 621F (see FIG. 6) in the write sequence counter 220 to cause the operation of the relays 720 and 722 in the data storage unit 701 (FIG. 7). The operation of the relays 720 and 722 in the data storage unit 701 stores the value of the first received digit.

Referring back to the input counter 200 (FIG. 5), the closure of the contacts 520C also forwards ground from the "0" and "2" conductors through the diodes 581 to the output terminal CI. This terminal is connected to the CW terminal in the write sequence counter 220 (FIG. 6). However, the auxiliary output provided by the closed contacts 621C is not utilized in the illustrated register sender.

After the delay interval provided by the network 531 (FIG. 5), the relay 530 releases to open the contacts 530A. This disconnects the latching conductors 571 and 572 from the source of latching ground applied to the latch terminal and causes the release of the operated one of the counting relays 561–570 as well as the release of the preliminary stage 550 and the restoration of the bistable circuit 540 to its normal condition. Thus, the input counter 200 is now restored to its normal condition in which it is capable of counting the next dial pulse train. When the contacts 530A are opened, ground is also removed from the terminal DO to release the relay D. This closes the contacts D–1 and prepares the pulse generating circuit including these contacts for operation when the first pulse in the next dial pulse train is received. The remaining digits dialed by the subscriber at the calling station 302 are counted in the input counter 200 and successively applied to different ones of the storage units 702–711 under the control of the write sequence counter 220 in the manner described above.

As set forth above, the register sender is also capable of being automatically conditioned for use with calling stations equipped with means for transmitting tones rather than dial pulses. When the calling station, such as the station 302, is provided with and uses tone transmitting facilities, the input counter 200 is not used, and the tone receiver 210 receives and translates the tone signals and supplies 2 of 5 marking to the input of the write sequence counter 220 which is selectively supplied under the control of the counter 220 to the digit storage units 701–711 in the data storage unit 240.

Those stations, such as the station 302, which are equipped with tone transmitting facilities are marked in the banks of the switch 310 by ground in the bank engaged by the wiper 311. Thus, if the calling station 302 is equipped with tone transmitting facilities, ground is forwarded from the wiper 311 when the adapter circuit 301 is selected, and this ground is applied through the closed contacts CT–3 and a pair of normally closed contacts G–1 to the operating winding of a relay TT to operate this relay. This ground is also applied to the operating winding of a slow-to-operate relay G. At the end of its slow-to-operate period, the relay G opens the contacts G–1 to terminate the operating pulse applied to the winding of the relay TT and maintains the winding of this relay disconnected from the wiper 311 for so long as ground is applied to the wiper 311.

When the relay TT is operated, the contacts TT–3 and TT–8 are opened, and a plurality of contacts TT–1, TT–2, and TT–4 to TT–7 are closed. The closure of the contacts TT–5 completes a holding circuit for the relay TT extending to the terminal AI in the input counter 200 and thence through the closed contacts 520B (FIG. 5) and the terminal BI to ground through a pair of normally closed contacts V–1 (FIG. 2). This holding circuit maintains the relay TT operated when the contacts G–1 are opened by the operation of the pulse generating relay G. The opening of the contacts TT–3 interrupts one path, and the closure of the contacts TT–4 prepares another path for coupling the dial tone generator 340 to the tip conductor of the extended switch train. The opening of the contacts TT–8 interrupts the path controlled by the input counter 200 for operating the interrupter relay INT and for supplying write signals to the write sequence counter 220. The closure of the contacts TT–7 connects ground through a pair of normally closed contacts TO–2 to the write terminal of the write sequence counter 220 so that this counter is advanced a single step to a setting in which the first digit storage unit 701 is selected to receive the first digit from the tone receiver 210. The closure of the contacts TT–7 also operates the interrupt relay INT so that the contacts INT–1 are opened to disable the timer TMR1 in the manner described above.

The closure of the contacts TT–1, TT–2, and TT–6 prepares the tone receiver 210 for association with the illustrated register sender, the tone receiver 210 being common to a number of register senders and being individually associated therewith by the finder switch 212. More specifically, the closure of the contacts TT–2 applies ground to a contact in one bank of the switch 212 that is individual to the illustrated register sender to mark this sender as the one requiring association with the tone receiver 210. The closure of the contacts TT–6 connects the winding of a relay TO to the contact in another bank individual to the register sender. The closure of the contacts TT–1 forwards ground through a pair of normally closed contacts TO–3 to a start terminal for the tone receiver 210 to initiate step-by-step operation of the finder switch 212.

When the finder switch 212 is advanced to a position individual to the illustrated register sender, as determined by the marking ground provided by the closed contacts TT–2, negative battery is forwarded through the closed contacts TT–6 to energize the winding of the relay TO. This operates the relay TO to open the contacts TO–2 and TO–3 and to close a plurality of contacts TO–1 and TO–4 to TO–9.

The closure of the contacts TO–5 to TO–9 connects five contact banks of the finder switch 212 to the common input terminals of the write sequence counter 220, thereby coupling the tone receiver 210 to the write sequence counter 220. The tone receiver 210 supplies 2 of 5 ground marking to these conductors in accordance with the coded representation of the received digit. The closure of the contacts TO–1 connects a further wiper of the finder switch 212 to the write terminal of the write sequence counter 220 and also to the winding of the relay INT through the closed contacts TT–7. The opening of the contacts TO–2 removes ground from the relay INT and the write terminal of the write sequence counter 220 to terminate the first operating pulse, which leaves the counter 220 in a condition in which the input terminals are connected to the five conductors 221A extending to the first digit storage unit 701. The opening of the contacts TO–3 removes start ground from the tone receiver 210 indicating that the calling register sender has been located.

The closure of the contacts TO–4 connects the dial tone generator 340 to the tip conductor of the incoming switch train and audibly advises the calling subscriber that the transmission of the digits necessary to extend the call can be initiated. The tip and ring conductors which have been extended from the adapter circuit 301 by the closure of the contacts CT–4 and CT–5 are connected over the terminals T–2 and R–2 to the similarly designated terminals in the upper two banks of the finder switch 212. In this manner, the incoming switch train is coupled to the tone receiver 210.

Thus, when the calling station 302 applies tones or tone combinations to the signaling channel representing the first digit, these tones are received and detected in the tone receiver 210, and the receiver applies positive-going pulses to two of the five conductors "0," "1," "2," "4," and "7" extending to the input of the write sequence counter 220. These pulses are forwarded to the selected digit storage units 701 in the data storage unit 240 and stored therein in the manner described above. The ground pulses applied to the marking conductors by the tone receiver 210 are also forwarded through the diodes 581 (FIG. 5) in the input counter 200 to be applied to the terminal CI. The ground pulse applied to the terminal CI is forwarded to the input terminal CW of the counter 220 and through a diode 231 to operate the dial tone relay DT to close the contacts DT–1 and to open the contacts DT–2. The closure of the contacts DT–1 completes a holding circuit for the relay DT, and the opening of the contacts DT–2 removes dial tone from the incoming switch train signifying the receipt of a digit from the calling station 302.

The tone generator 210 then transmits a ground pulse through the closed contacts TO–1 to again energize the relay INT and to provide an operating pulse to the write terminal of the write sequence counter 220 so that this counter is advanced to its second setting in which the digit marking conductors are extended to the second digit storage unit 702 in preparation for the receipt of the second transmitted digit. The ground pulses representing the next digit are then supplied by the receiver 210. This operation continues until all of the digits transmitted from the calling station 302 have been received and stored in the data storage unit 240.

The register sender also includes means for releasing the tone receiver 210 if dial pulses are received even after the register sender has been converted for tone reception by the ground marking applied to the wiper 311 in the manner described above. This permits a single subscriber line, for instance, to have both dial pulse and tone transmitting facilities and to permit calls to be extended using either of these facilities.

If a dial pulse is received following the conditioning of the register sender for the receipt of tone signals in the manner described above, the first dial pulse received by the input counter 200 causes the operation of the relay 520 (FIG. 5) in the manner described above so that the contacts 520B are opened. The opening of the contacts 520B removes the connection between the terminals BI and AI so that the holding ground supplied through the closed contacts V–1 and TT–5 is removed from the winding of the relay TT. This causes the release of this relay and the consequent release of the relay TO. The release of these two relays restores the register sender to its normal condition in which it is conditioned for operation in response to dial pulses. The relay TT cannot be reoperated even though marking ground remains on the wiper 311 because this ground holds the relay G operated and thus maintains the contacts G–1 in an open state in which the operating circuit for the relay TT cannot be completed.

During the outpulsing or transmitting operation of the illustrated register sender, the digits stored in the data storage unit 240 are transmitted to the outgoing line under the control of the output counter 410 in a sequence determined by the read sequence counter 400. The read sequence counter 400 (FIG. 8) includes a fifteen step counting chain 800 similar to that used in the input counter 200 and the write sequence counter 220. More specifically, the counter 800 includes a preliminary stage or relay 830 and fourteen additional stages or counting relays 831–844 which are operated in sequence. When the contacts H–1 or B–7 (FIG. 1) are closed incident to seizure of the adapter circuit 301 to provide a source of latching ground, this ground is applied to the latch terminal of the read sequence counter 400 (FIG. 8) to energize the operating winding of a slow-to-operate relay 820. This ground is also forwarded through a pair of normally closed contacts 820A on the relay 820 to operate the preliminary stage 830, which relay is held operated by the ground provided on the latch terminal. After the slow-to-operate period of the relay 820, this relay operates to open the contacts 820A. Thus, in the normal initial condition of the read sequence counter 400, the preliminary relay or stage 830 is operated. Thereafter, the successive application of ground pulses to the read terminal of the read sequence counter 400 controls a bistable circuit 810 to sequentially operate the remaining relays 831–844 in sequence.

All of the relays 830–844 close five normally open contacts similar to five contacts 830A–830E controlled by the preliminary relay 830. Each of the sets of five contacts controlled by the counting relays 830–843 connects a common group of marking conductors "0," "1," "2," "4," and "7" to a selected one of the digit storage units 701–711 and 713–715 in the data storage unit 240. The common conductors "0," "1," "2," "4," and "7" extend to the input of the output counter 410. In addition, certain of the counting relays 831–844 include additional contacts for performing auxiliary control functions at different points in the read or transmitting sequence. As an example, the relay 831 includes a pair of additional contacts 831A and 831B. The contacts 831A connect a terminal C to a terminal 1D in the second position of the counting circuit 800, and the contacts 831B connect a terminal DD with a terminal D1 in this second stepping position of the circuit 800.

Figure 8:
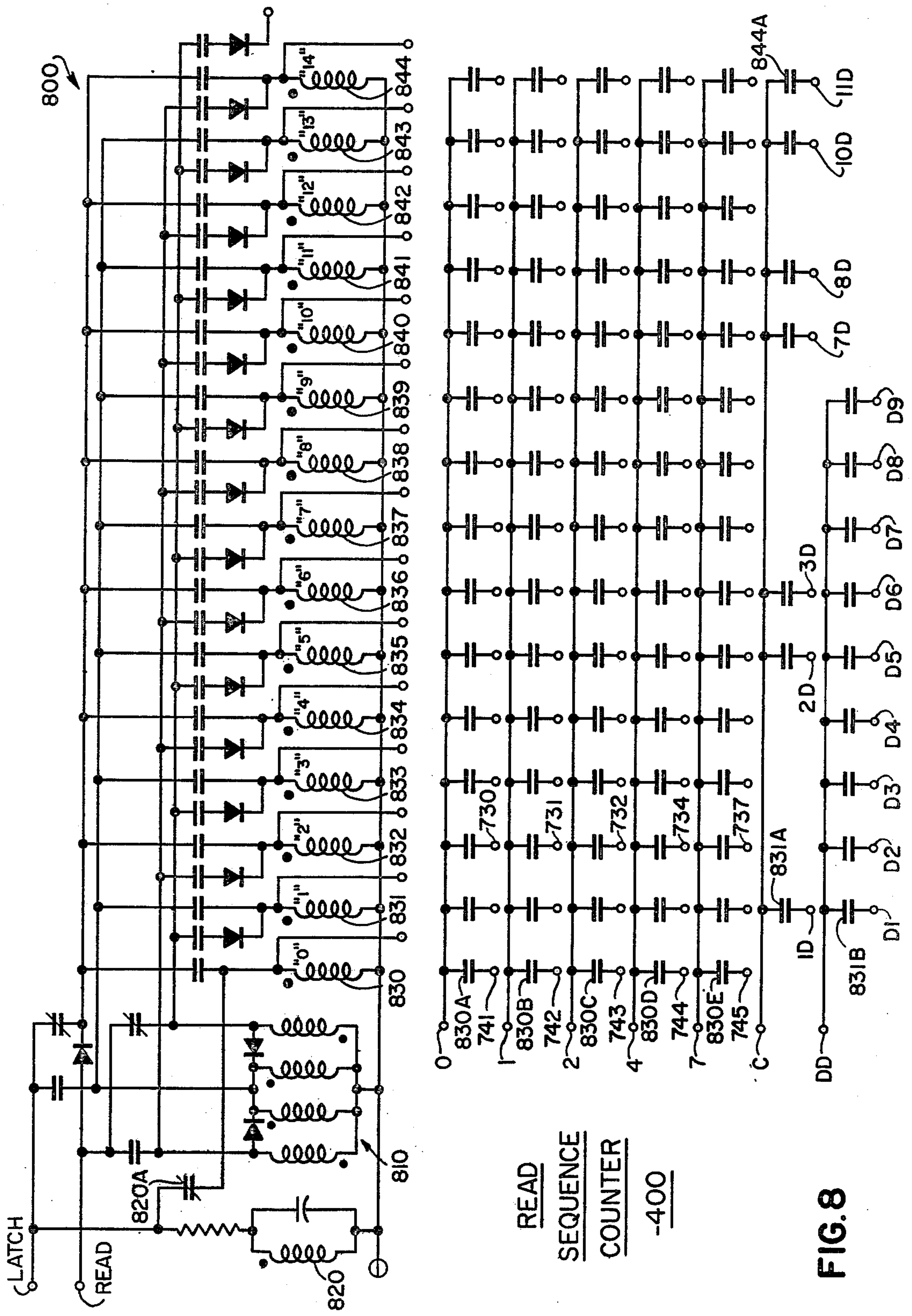
FIG. 8 is a schematic diagram of a read sequence counter included in the register sender.
Figure 9:
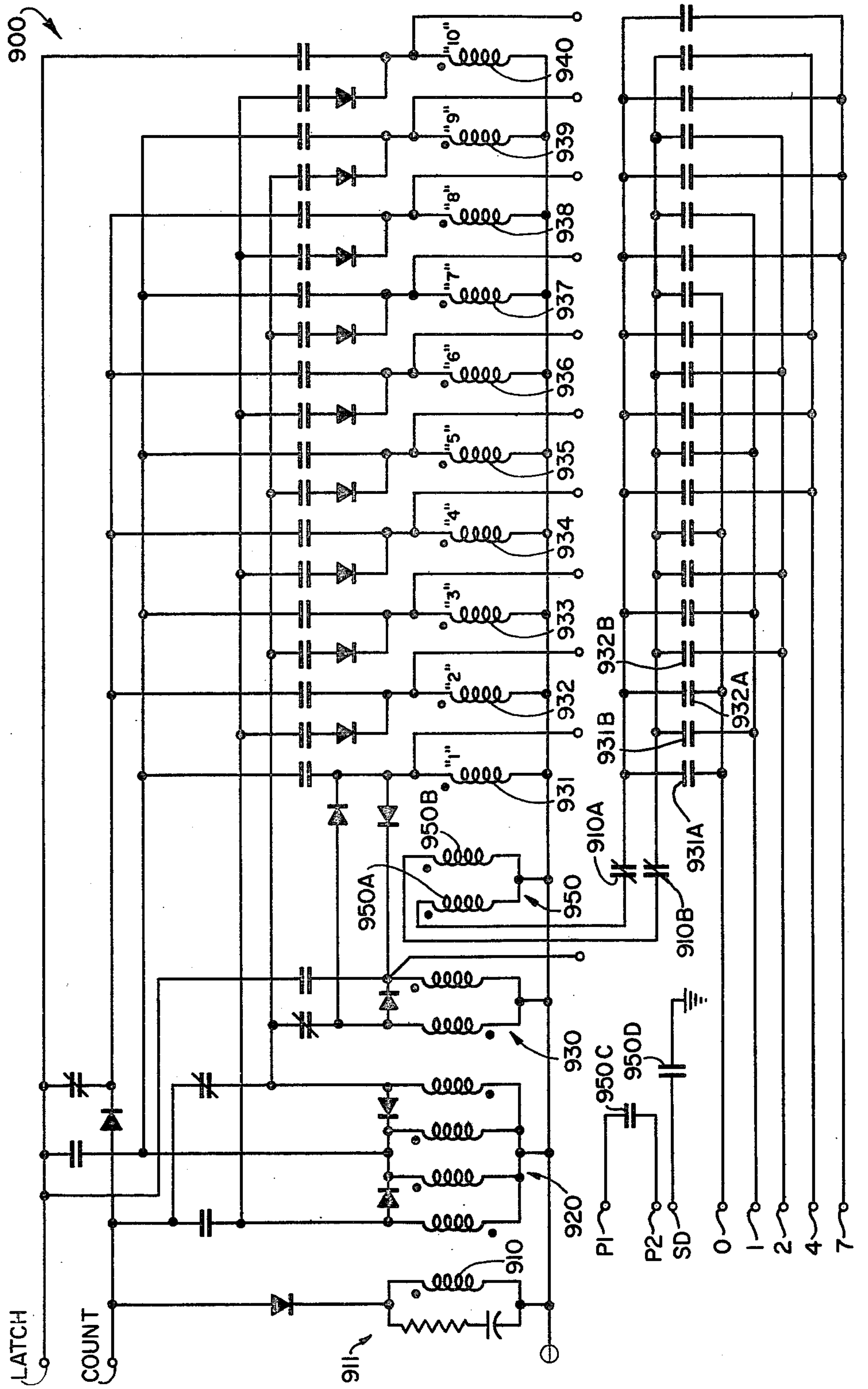
FIG. 9 is a schematic diagram of an output counter for the register sender.

Since the counting relays 830–844 are operated in sequence, the connections between the contacts operated thereby and the output terminals of the various digit storage units in the data storage unit 240 determines the order in which the stored digits are transmitted from the register sender. Although this order can be varied, the relays 830–843 render the digit storage units in the data storage unit 240 effective in the following sequence: 713, 714, 715, and 701–711, respectively. The relay 844 closes a pair of contacts 844A to provide an overflow indication. As an illustration, the five output terminals from the thirteenth digit storage unit 713 (FIG. 7) in the data storage unit 240 are connected to the contacts 830A–830E (FIG. 8). Thus, when the register sender is seized and ground is applied to the latch terminal of the read sequence counter 400 in the manner described above, the output of the digit storage unit 713 is immediately connected to the common digit marking busses extending to the input of the output counter 410 by the operation of the preliminary relay or stage 830. As a further example, the fourth digit transferred from the data storage unit 240 to the output counter 410 is the digit stored in the first data storage unit 701. Accordingly, the output terminals 730, 731, 732, 734, and 737 thereof (FIG. 7) are connected to five normally open contacts controlled by the relay 833 (FIG. 8).

As indicated above, the maximum digit transmitting capacity of the register sender is fourteen digits because of the fact that only fourteen of the fifteen data storage units 701–711 and 713–715 are connected to the steering contacts of the counting circuit 800. The remaining digit storage unit 712 does not store digital values but is supplied by the routing director coder 230 with an item of control information representing different combinations of digits stored in the data storage unit 240 that are to be deleted from the output transmission. Thus, the output terminals D1 to D5 in the digit storage unit 712 (FIG. 7) are connected to the similarly designated terminals in FIG. 8 controlled by the counting relays 831–835. If one of the storage relays in the unit 712 is operated, the closure of the contact connected to its output terminal, such as the contacts 831B connected to the terminal D1, applies ground to the terminal DD when the counting relay 831 is operated. Similarly, the sequential operation of the relays 832–835 to sequentially close the contacts connected to the terminals D2, D3, D4, and D5 selectively applies ground to the output terminal DD in dependence on the data stored in the storage unit 712. The operation of the relays 831, 835, 836, 840, 841, and 843 closes contacts, such as the contacts 831A, in the second, sixth, seventh, eleventh, twelfth, and fourteenth steps of the output counting order to couple ground received from the input terminal C to a plurality of output terminals 1D, 2D, 3D, 7D, 8D, and 10D. The overflow contacts 844A connect the terminal C to an output terminal 11D.

As set forth above, the read sequence counter 400 selectively connects the 2 of 5 codes stored in different ones of the digit storage units 701–711 and 713–715 in sequence to a set of common digit marking conductors, and these conductors are extended to the input of the output counter 410 (FIG. 4) to control the output counter 410 to transmit a number of pulses corresponding to the coded designation received from the connected digit storage unit. The output counter 410 (FIG. 9) comprises a counting chain 900 substantially identical to the input counter 200 and comprises an input relay or stage 930 and ten counting stages or relays 931–940 which are operated in sequence under the control of a bistable circuit or flip-flop 920. Thus, when ground is first applied and removed from a count terminal, the preliminary relay 930 and the first counting relay 931 are operated, and the bistable circuit 920 is operated to its alternate state to steer the second pulse to the second counting relay 932, the operation of which releases the first counting relay 931. The preliminary relay or stage 930 remains operated throughout each cycle of operation of the counting circuit 900.

To provide means for detecting when the setting of the counting circuit 900 equals the digital value supplied from the data storage unit 240 by the read sequence counter 400, the counting circuit 900 includes an additional control relay 910 and an AND gate 950 which compares the setting of the counting circuit 900 with the 2 of 5 marking received on the common digit marking conductors "0," "1," "2," "4," and "7." When the first count pulse is received, the winding of the control relay 910, which winding is shunted by a slow-to-release network 911, is energized to operate this relay so that the two pairs of normally closed contacts 910A and 910B are opened. The delay of the relay 910 is such that it releases between the successive pulses applied to the count terminal. Thus, at the end of each count pulse, the contacts 910A and 910B are closed to connect a pair of windings 950A and 950B in the AND gate 950 to the digit marking conductors in dependence on the one of the counting relays 931–939 that is in an operated condition. The windings 950A and 950B produce magnetic fields linking the magnetic elements of a pair of reed switches providing two pairs of normally open contacts 950C and 950D. The arrangement is such that both of the windings 950A and 950B must be concurrently energized to develop a magnetic field large enough to close the contacts 950C and 950D.

As an illustrative example, assuming that the value of the digit stored in a selected one of the digit storage units in the data storage unt 240 is "2," the conductors "0" and "2" received ground. At the end of the first count pulse applied to the output counter 410, the relay 931 is operated to close the contacts 931A and 931B, among others. When the relay 910 times out and closes the contacts 910A and 910B, the winding 950A is connected to the grounded conductor "0," and the winding 950B is connected to the open conductor "1." Thus, only the winding 950A is energized, and the contacts 950C and 950D remain open.

When the next input pulse is received, the contacts 910A and 910B are again opened. The relay 931 is released, the relay 932 is operated, and the relay 910 again times out to close the contacts 910A and 910B. The release of the relay 931 opens the contacts 931A and 931B, among others, and the operation of the relay 932 closes the contacts 932A and 932B, among others. Accordingly, when the contacts 910A and 910B are closed, the winding 950A is connected to ground through the closed contacts 910A and 932A, and the winding 950B is connected to ground through the contacts 910B and 932B. Thus, both of the windings 950A and 950B are energized, and the flux field developed thereby is sufficient to close the contacts 950C and 950D. The closure of the contacts 950D applies ground to a terminal SD, and the closure of the contacts 950C connects a pair of terminals P–1 and P–2. Thus, an output indication is provided that the counting circuit 900 has advanced two steps to a setting representing the value of the stored digit "2."

As indicated above, the register sender coupled with the adapter circuit 301 provides a virtually universal interface between the line finder in existing direct control systems and subsequent local switching equipment, trunks, and toll ticketing equipment, and, in effect, converts the system from direct control to common control. Thus, the register sender is capable of providing, for instance, uniform directory number dialing to all points in an extended area service network without, for instance, the necessity of using digit absorbing selectors, of permitting direct dialing of various types of toll calls, and of permitting standardization of service codes or the use of standard access codes where required. This is accomplished by an examination of the incoming digits received from the calling station, such as the calling station 302, and by the transmission of digits varying in number and value to the subsequent switch train 306 which are necessary to effect the desired switch train extension.

One of the types of calls presented to the register sender is the extension of a connection to an operator by transmitting, either by tone frequencies or dial pulses, only the digit "0." The register sender thus receives "0" followed by a period of time in which additional digital information is not received. Assuming that the register sender has been seized and associated with the adapter circuit 301 in the manner described, "0" is transmitted from the calling station 302 and is stored in the first digit storage unit 701 by the write sequence counter 220 in the manner described above, either under the control of the tone receiver 210 or the input counter 200. As set forth above, the ground pulse applied to the latch terminal of the read sequence counter 400 operates the relay 830 so that the contacts 830A-830E are closed to connect the output terminals 741–745 of the digit storage unit 713 to the digit marking conductors extending to the input of the output counter 410. However, since a digit is stored in only the digit storage unit 701 at this time, marking potentials are not supplied to the input of the output counter 410, and marking ground is applied to only the terminals 734 and 737 in the first digit storage unit 701 because of the operation of the relays 734 and 737 representing the received "0."

To provide means for recognizing the receipt of "0" as the first digit in a call, a relay Z (FIG. 4) is provided connected to the output terminals 734 and 737. The relay Z includes two pairs of normally open contacts Z–1 and Z–2 which are closed only when both of the windings of the relay Z are energized. Since these two windings are concurrently energized only when the storage unit 701 stores "0," the contacts Z–1 and Z–2 are closed only when "0" is stored and received as the first digit in a call. The closure of the contacts Z–2 connects the operating winding of a relay PP to the terminal CW–2 in the write sequence counter 220 through a pair of normally closed contacts TMR3–3 on a third timer. The closure of the contacts Z–1 completes a circuit for energizing the timer TMR3 over a circuit including a pair of normally closed contacts PP–1 on the relay PP.

In the event that a second digit is dialed subsequent to the "0," thus indicating that an operator call is not desired, the write sequence counter 220 is advanced to its second position in the manner described above, and the input counter 200 forwards ground from the terminal CI to the terminal CW in the write sequence counter 220. This ground pulse is forwarded over the terminal CW–2 of the above-described circuit to operate the relay PP. In operating, the relay PP opens the contacts PP–1 and an additional pair of normally closed contacts PP–2 and closes a pair of normally open contacts PP–3. The closure of the contacts PP–3 completes a holding circuit for the relay PP, and the opening of the contacts PP–1 terminates operation of the timer TMR3. The disabling of the timer TMR3 prevents the register sender from responding to the call as being intended for an operator. The opening of the contacts PP–2 does not perform any useful function at this time.

On the other hand, if digits are not dialed subsequent to the initial "0," the timer TMR3 times out after a delay interval of around four seconds and closes a plurality of contacts TMR3–1 and TMR3–2 and opens the contacts TMR3–3. The opening of the contacts TMR3–3 prevents operation of the relay PP if additional digits are dialed following the delay interval of the timer TMR3. The closure of the contacts TMR3–2 connects the terminal 1D of the read sequence counter 400 through a pair of normally closed contacts ED3–3 to the winding of a release relay RLS. The closure of the contacts TMR3–1 applies ground to a terminal 350 which is connected to a selected set of input terminals to the thirteenth digit storage unit 713 in the data storage unit 240 (FIG. 7). As illustrated in FIG. 7, the terminal 350 is connected to windings of two relays representing the weights "4" and "7" to provide a 2 of 5 coded representation of "0." Thus, ground is now applied to the terminals 744 and 745 which are connected to the digit marking busses extending to the input of the output counter 410 by the operated relay 830 in the read sequence counter 400. These five digit marking conductors are also individually connected to one of five windings in a parity check relay PC (FIG. 4), the other sides of which are connected to a pair of normally open contacts PCI–1 on a relay PCI. The relay PC provides a means of checking whether a proper code is present on the digit marking conductors.

Figure 3:
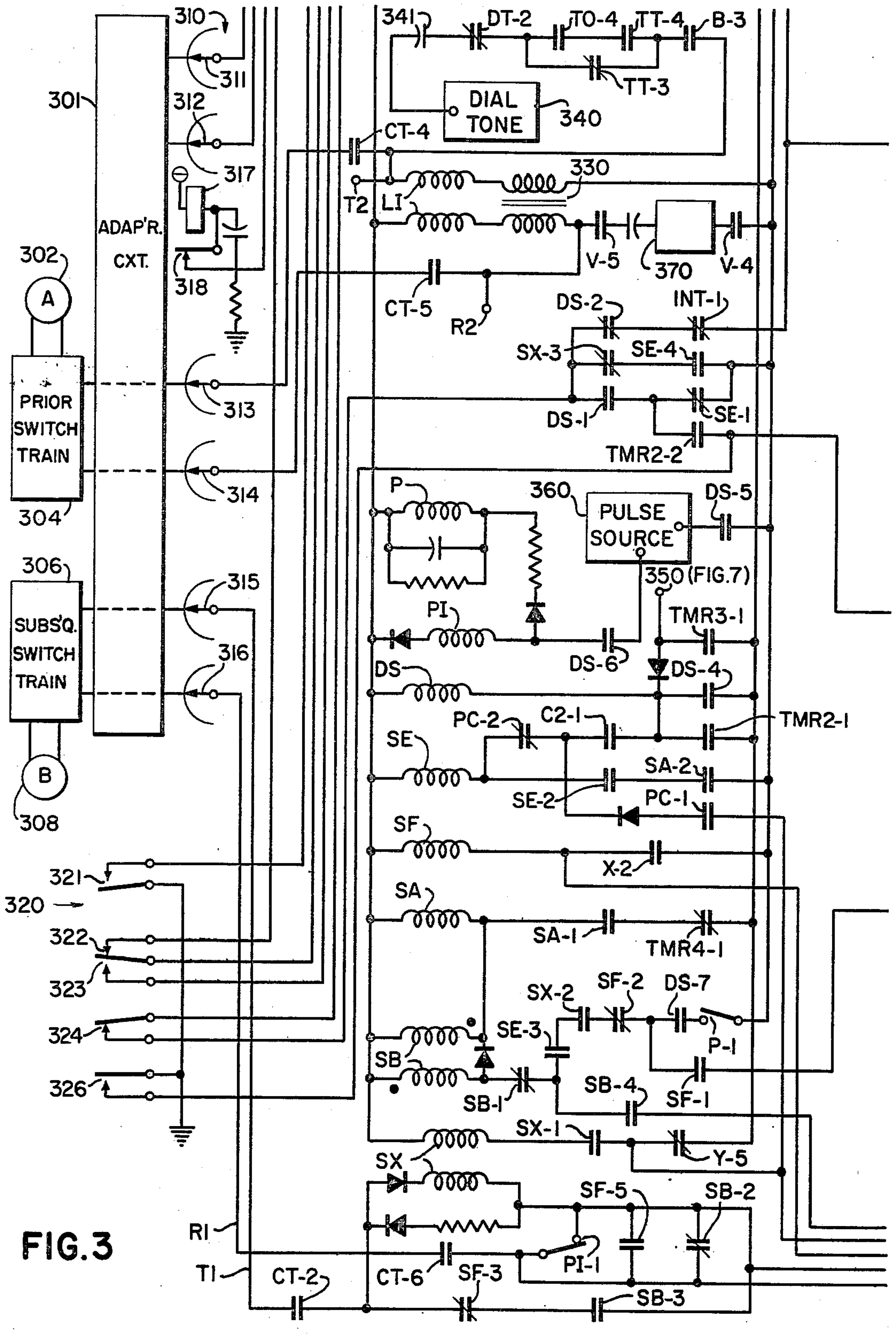

More specifically, the relay PC includes a pair of normally open contacts PC–1 and a pair of normally closed contacts PC–2 (FIG. 3). The flux fields developed by the five windings of the PC relay are so proportioned that when two and only two of the windings are energized, the contacts PC–1 are closed. If more than two of the five windings of the PC relay are energized, the contacts PC–2 are opened.

The parity check relay PC is enabled incident to seizure of the register sender. More specifically, when the cut-through relay is operated to close the contacts CT–1 (FIG. 1) incident to seizure of the register sender, ground is forwarded through a pair of normally closed contacts Y–5 to the latch terminal of the output counter 410 and to the operating winding of the relay PCI so that this relay closes the contacts PCI–1. Thus, when ground marking potentials are applied to the digit marking conductors extending between the read sequence counter 400 and the output counter 410, a group of the five windings are energized in accordance with the ground marking potentials on the digit marking conductors. Assuming that two and only two of the windings are energized, thus indicating proper coding, the contacts PC–1 are closed, and the ground provided by the closed contacts Y–5 is forwarded through the closed contacts PC–2 to energize the winding of a relay SE. The operation of the relay SE indicates a correct parity check. On the other hand, if only one of the PC windings is energized, the contacts PC–1 are not closed, and the relay SE is not energized. Further, if more than two of the windings of the PC relay are energized, the contacts PC–2 are opened, and the relay SE also is not operated.

Thus, the energization of the winding of the relay SE indicates to the register sender that a correctly coded digit has been transferred through the read sequence counter 400 to the output counter 410. When the relay SE is operated, a pair of normally closed contacts SE–1 are opened, and three pairs of normally open contacts SE–2, SE–3, and SE–4 are closed. The opening of the contacts SE–1 interrupts one path controlled by the normally open pair of contacts DS–1 for starting the first timer TMR1. The closure of the contacts SE–4 prepares a circuit interrupted at the open contacts SX–3 for starting the first timer TMR1. The closure of the contacts SE–2 prepares a holding circuit for the relay SE extending to a pair of normally open contacts SA–2. The closure of the contacts SE–3 prepares an operating circuit for a hybrid flip-flop circuit including a pair of relays SA and SB.

The ground signal provided by the closure of the contacts TMR3–1 (FIG. 3) is also forwarded through a diode to energize the winding of a relay DS so that this relay operates. In operating, the relay DS opens the contacts DS–2 and an additional pair of normally closed contacts DS–3 and closes a plurality of contacts DS–1 and DS–4 to DS–7. The closure of the contacts DS–4 provides a holding circuit for maintaining the relay DS energized. The closure of the contacts DS–7 prepares an additional point in the operating circuit for the hybrid flip-flop including the relays SA and SB. The opening of the contacts DS–2 interrupts an additional point in a circuit for initiating operation of the first timer TMR1, and the closure of the contacts DS–1 prepares a point in the circuit interrupted by the open contacts SE–1 for operating the first timer TMR1. The opening of the contacts DS–3 performs no useful function at this time.

The closure of the contacts DS–5 applies a ground start signal to a pulse generator or source 360, and the closure of the contacts DS–6 connects the pulse output of the source 360 to the operating windings of two relays P and PI. The relays P and PI provide a pulse source for controlling the transmission of count pulses to the output counter 410 and for transmitting corresponding pulses through the adapter circuit 301 to the subsequent or outgoing switch train 306. The relay PI operates on each ground pulse applied by the source 360 while the relay P operates somewhat later in the pulse because of the slow-to-operate network associated therewith.

Accordingly, the relay PI first operates to open the contacts PI–1, which is without effect at this time. Thereafter, the relay P operates to close the contacts P–1 and complete a circuit for forwarding ground through the closed contacts DS–7, SF–2, SX–2, SE–3, and SB–1 to energize both windings of the relay SB and the single winding of the relay SA in the hybrid flip-flop or bistable circuit. This flip-flop is shown and described in detail in U.S. Patent No. 3,244,942. The two windings of the relay SB are differentially wound, and the concurrent energization thereof prevents any change in the state of the contacts controlled thereby. However, the energization of the winding of the relay SA operates this relay so that three pairs of normally open contacts SA–1 to SA–3 are closed. The closure of the contacts SA–1 completes a holding circuit for the relay SA extending through a pair of normally closed contacts TMR4–1 on the fourth timer TMR4. The ground provided by this circuit also maintains one of the windings of the relay SB energized. The closure of the contacts SA–2 completes the holding circuit extending through the closed contacts SE–2 so that the relay SE is maintained in an operated state. The closure of the contacts SA–2 prepares a holding circuit for a hybrid flip-flop including a differentially wound relay Y and a relay X, the holding circuit being interrupted at a pair of normally open contacts X–1.

At the end of the pulse from the source 360, the relays P and PI release to open the contacts P–1 and to close the contacts PI–1. The closure of the contacts PI–1 is without effect at this time other than to establish another parallel path of continuity between the tip and ring conductors of the outgoing signaling channel. The opening of the contacts P–1 interrupts the above-described operating circuits for the relays SA and SB so that the lower winding of the relay SB is no longer energized. The upper winding of the relay SB remains energized over the circuit including the closed contacts SA–1 and TMR4–1. Accordingly, the net flux developed by the windings of the relay SB is effective to open the contacts SB–1 and SB–2 and to close a plurality of contacts SB–3 to SB–5.

The opening of the contacts SB–1 interrupts the above-described operating circuit for the hybrid flip-flop including the relays SA and SB. The opening of the contacts SB–2 removes the shunt from around the pulsing contacts PI–1 for interrupting the outgoing signaling channel. The closure of the contacts SB–3 provides a shunt around the lower winding of the relay SX so that the impedance of this circuit is removed from the signaling channel during pulse transmission. The closure of the contacts SB–5 prepares a circuit for supplying a read pulse to the read sequence counter 400. The closure of the contacts SB–4 prepares a circuit for forwarding ground to the count terminal of the output counter 410.

When the next pulse is delivered by the pulse source to operate the relays PI and P in sequence, the contacts PI–1 are first opened to interrupt the continuity of the outgoing signaling channel and thus initiate the transmission of the first dial pulse to the subsequent switch train 306. The relay SX remains operated because its upper winding is energized over the closed contacts SX–1 and V–5. The closure of the contacts P–1 forwards ground through the closed contacts DS–7, SF–2, SX–2, SE–3, and SB–4 to the count terminal of the output counter 410. When the pulse from the pulse source 360 terminates, the relays PI and P release to close the contacts PI–1 and to open the contacts P–1. This terminates the first dial pulse to the outgoing switch train and removes ground from the count terminal of the output counter 410 so that the counting circuit 900 (FIG. 9) therein advances a single step to a setting in which the relays 910, 930, and 931 are operated and the bistable circuit 920 is in its alternate state. The relay 910 releases in the interval following the release of the relays P and PI to close the contacts 910A and 910B so that ground on the digit marking conductors selected by the operated relay 931 is forwarded to the two windings 950A and 950B of the AND gate 950. Since "0" is stored in the digit storage unit 713, ground is applied to the "4" and "7" conductors, and neither winding 950A nor 950B is energized.

The above-described operations continue under the control of the pulse source 360 until ten count pulses have been transmitted to the output counter 410 by the contacts P–1 and ten corresponding dial pulses have been transmitted over the outgoing switch train by the contacts PI–1. In the time interval following the termination of the tenth dial pulse, the relay 910 again releases to close the contacts 910A and 910B. Since ground is applied to the "4" and "7" digit marketing conductors, this ground is now forwarded through the closed contacts 910A and 910B, and both of the windings 950A and 950B are energized. This causes the closure of the contacts 950C and 950D. The closure of the contacts 950C immediately places a shunt around the pulsing contacts PI–1 so that no further dial pulses can be transmitted to the outgoing signaling channel. The ground applied to the terminal SD energizes the winding of a stop relay SF.

The operation of the relay SF closes a plurality of contacts SF–1, SF–4, and SF–5 and opens the contacts SF–2 and SF–3. The opening of the contacts SF–2 prevents the transmission of further ground pulses to the count terminal of the output counter 410. The opening of the contacts SF–3 removes the shunt around the lower winding of the relay SX. The closure of the contacts SF–5 provides a shunt in addition to that provided at the terminals P–1 and P–2 across the contacts PI–1. The closure of the contacts SF–4 initiates the operation of the fourth timer TMR4 which provides a delay equal to the desired interdigital interval. The closure of the contacts SF–1 completes a circuit controlled by the pulsing contacts P–1 for supplying a ground pulse to the read terminal of the read sequence counter 400.

Therefore, when the pulse source 360 next operates the relays P and PI, the opening of the contacts PI–1 does not transmit a dial pulse to the outgoing signaling channel because of the shunt across this pair of contacts. The closure of the contacts P–1 forwards ground through the closed contacts DS–7, SF–1, Y–4, and SB–5 to the read terminal of the read sequence counter 400 (FIG. 8). As described above, this first read signal, which is terminated when the relays P and PI are released to open the contacts P–1, releases the relay 830 (FIG. 8) and operates the relay 831 .When the relay 831 is operated, the five digit marking conductors in the digit storage unit 714 are coupled to the output counter 410, and the connection to the digit storage unit 713 is interrupted. Since no information is stored in the digit storage unit 714, the output counter 410 does not receive an input, and the two windings previously energized in the parity check relay PC are no longer energized so that the contacts PC–1 are opened. The relay SE remains energized over the holding circuit including the closed contacts SE–2 and SA–2. In addition, the operation of the relay 831 in the read sequence counter 400 closes the contacts 831A so that the terminal C is coupled to the terminal 1D to prepare an additional point in the operating circuit for the release relay RLS.

The ground pulse applied through the closed contacts SF–1 by the closed contacts P–1 is also forwarded through a pair of normally closed contacts Y–1 to energize both of the windings of a relay Y and the single winding of a relay X forming another hybrid flip-flop circuit. Energization of both of the windings of the relay Y prevents actuation of the contacts controlled thereby. However, the energization of the winding of the relay X operates this relay to close two pairs of normally open contacts X–1 and X–2. The closure of the contacts X–2 completes an obvious holding circuit for the relay SF. The closure of the contacts X–1 completes a holding circuit for the relay X and also a holding circuit for maintaining the upper differential winding of the relay Y in an energized condition. Accordingly, when the contacts P–1 are opened to terminate the first read pulse to the read sequence counter 400, the lower differential winding of the relay Y is no longer energized, and the contacts controlled thereby are actuated.

In operating, the relay Y opens the contacts Y–1, Y–4, and Y–5 and closes a plurality of contacts Y–2 and Y–3. The opening of the contacts Y–1 interrupts the above-described operating circuit for the bistable circuit including the relays X and Y. The opening of the contacts Y–4 interrupts a point in the previously interrupted circuit for supplying a ground pulse to the read terminal of the read sequence counter 400. The closure of the contacts Y–2 prepares an alternative circuit for supplying the ground pulses to the read terminal of the counter 400, which alternate circuit is interrupted by a pair of normally open contacts DD–1. The opening of the contacts Y–5 terminates the energization of the upper winding of the relay SX, but this relay remains operated if the continuity of the outgoing signaling channel is intact. The opening of the contacts Y–5 also releases the relay PCI to open the contacts PCI–1 and prevent operation of the parity check relay PC.

The opening of the contacts Y–5 also removes latching ground from the output counter 410 so that this counter is restored to a reset condition in which all of the relays therein are restored to a released condition. This causes the opening of the contacts 950C and 950D (FIG. 9) so that the shunt between the contacts P–1 and P–2 is removed and ground is removed from the terminal SD. The removal of ground from the terminal SD does not release the relay SF because of the holding circuit thereof completed by the prior closure of the contacts X–2. The removal of the shunt between the terminals P–1 and P–2 does not affect the continuity of the outgoing signaling line because of the prior closure of the contacts SF–5.

The closure of the contacts Y–3 forwards ground to the terminal C in the read sequence counter 400 (FIG. 8), and this ground is applied to the terminal 1D by the closed contacts 831A. The ground from the terminal 1D (FIG. 4) is forwarded through the contacts TMR3–2 which were previously closed by the third timer TMR3 and through the closed contacts ED3–3 to energize the winding of the release relay RLS. The release relay RLS is operated at this time in the operating cycle of the register sender because the third timer TMR3 has timed out, and only a "0" has been received from the calling station 302 to indicate that an operator call is desired. Thus, only a single digit needs to be transmitted to the outgoing switch train.

The energization of the RLS relay opens the normally closed contacts RLS–1 so that ground is removed from the relay L, and this relay releases. The release of the relay L causes the restoration of all of the components of the register sender to their normal condition, and, in doing so, removes latching ground from the counters and data storage units so that these components are also all restored to a normal condition. Thus, the register is released and reset and is capable of being assigned to the next call. With the release of the register, the adapter circuit 301 connects the switching components 304 and 306 to maintain the communication path.

As a further illustration of the operation of the register sender, it is assumed that the calling station 302 wishes to reach the called station 308 which is identified by the designation or directory number "991–XXXX." However, the switch train requires only "91–XXXX" for the extension of the connection to the office in which the called station 308 is assumed to be located. One manner in which this call might be handled by the register sender is to store the received seven digits in the storage units 701–707, to transfer values of the three code digits "991" to the routing director coder 230, to return the digit "9" in the code "91" to the storage unit 713 for storage, and to store in the storage unit 712 instructions to delete the transmission of any data stored in the digit storage units 714, 715, 701, and 702. Thus, during the transmitting cycle, the digit "9" stored in the digit storage unit 713 by the routing director coder 230 is first transmitted followed by the digits "1–XXXX" stored in the code storage units 703–707 by the calling subscriber.

More specifically, the illustrated register sender is seized and associated with the adapter circuit 301 in the manner described above, and the three code digits "991" are stored in the storage units 701, 702, and 703 by the input counter 200 or the tone receiver 210 in the manner described above. As the third digit "1" is stored in the storage unit 703 by the write sequence counter 220, a ground pulse is applied to the terminal CW–3 through the contacts 623C (FIG. 6) closed by the operation of the third steering relay 623, this ground pulse being applied to the terminal CW of the counter 220 from the terminal CI in the input counter 200 regardless of whether the input counter 200 or the tone receiver 210 is supplying the digits received from the calling station 302.

The ground pulse from the terminal CW–3 is forwarded to one winding of a differential relay C1 having a pair of oppositely wound windings. The ground pulse from the terminal CW–3 energizes only one winding of the relay C1 so that this relay operates to close two contacts C1–1 and C1–2 and to open a pair of normally closed contacts C1–3. The closure of the contacts C1–1 completes a holding circuit for the upper winding of the relay C1 to maintain this relay operated when the ground pulse disappears from the terminal CW–3. The opening of the contacts C1–3 removes a ground shunt from the operating winding of a relay C2. The closure of the contacts C1–2 applies start ground to a busy test circuit 150 (FIG. 1) which checks the idle or busy condition of the routing director coder 230 and the NGT coder 250.

If these circuits, which are common to a plurality of register senders, are in an idle condition, the busy test circuit 150 returns negative battery to the winding of the relay C2 so that this relay closes two pairs of normally open contacts C2–1 and C2–2. The closure of the contacts C2–1 prepares a portion of an operating circuit for the relay SE. The closure of the contacts C2–2 forwards grounds through a pair of normally closed contacts NG2–2 to a group of switching relays in the routing director coder 230 so that these relays operate to connect the input to the routing director coder 230 to the output of the storage units 701–703 in which are stored the three received code digits. The operation of this switching equipment also connects the output of the routing director coder to the inputs of the four storage units 712–715.

The unit 230 now translates the received code digits "991" stored in the storage units 701–703 and determines that only the digits "91–XXXX" are required to complete the extension of the call to the desired exchange and station. Thus, the routing director coder 230 stores the digit "9" in the storage unit 713 by supplying ground to the input terminals 746 (FIG. 7) representing the code weights "2" and "7." Thus, ground is now applied to the output terminals 743 and 745 in the storage unit 713. The first digit to be transmitted "9" is now stored in the storage unit 713 which is the first digit storage unit rendered effective in the output transmitting cycle.

The second digit "1" to be transmitted was stored in the storage unit 703 by dialing, and the remaining digits to be transmitted are in the process of being stored in the storage units 704–707 by the subscriber. Since the storage units 703–707 containing these five digits are the sixth to ninth digit storage units in the output transmitting cycle, the routing director coder 230 also supplies the data storage unit 240 with information indicating that no output information is to be transmitted under the control of the storage units 714, 715, 701, and 702 which are the second through fifth storage units to be examined in the output transmitting cycle. Accordingly, the routing director coder operates the four left-hand relays in the storage unit 712 so that ground is applied to the four terminals D1 to D4. These ground signals are forwarded to the correspondingly numbered terminals in the read sequence counter 400 (FIG. 8). Thus, the data storage unit 240 now stores the first outgoing code digit "9" in the storage unit 713, does not store data in the storage units 714 and 715, stores the received digits "991" in the storage units 701–703, and stores the four directory numbers "XXXX" in the storage units 704–707.

The register sender begins the transmission or outpulsing of data as soon as the routing director coder 230 supplies the digit "9" to the storage unit 713. As set forth above, the digit storage unit 713 is cut-through to the input of the output counter 410 by the read sequence counter 400 as soon as the register sender is seized. Thus, the parity check relay PC again performs a parity check and supplies a ground signal through the closed contacts PC–1 and PC–2 to operate the relay SE in the manner described above if the parity check is satisfactorily completed. Since the first digit is supplied through the read sequence counter 400 to the output counter 410 during the time in which the routing director coder 230 is associated with the data storage unit 240, the relay C2 is operated and the contacts C2–1 are closed. Thus, the ground supplied by the closed contacts PC–1 is also forwarded through the closed contacts C2–1 to operate the relay DS. The operation of the relay DS opens the contacts DS–3 to release the relay C1. When the relay C1 is released, the opening of the contacts C1–2 removes the start ground from the busy test circuit 150 and causes the release of the relay C2. This releases the coder 230 for other use.

The operation of the relays SE and DS functions in the manner described above to initiate the transmission of the first digit over the outgoing signaling train, and this digit transmission continues until nine pulses equal to the value of the digit "9" stored in the digit storage unit 713 have been sent. At that time, the terminals P1 and P2 in the output counter 410 are shunted to insure continuity of the outgoing line, and ground is applied to the terminal SD to operate the relay SF.

In the operator call described above, the register sender was required to supply only a single train of ten pulses representing "0." However, in the present instance, a series of digits must be transmitted, and the application of a read pulse to the sequence counter 400 which results in the connection of the data storage unit 714 to the input of the output counter 410 and the application of a ground pulse to the terminal 1D does not cause the operation of the release relay RLS because the contacts TMR3–2 are no longer used.

Figure 4:
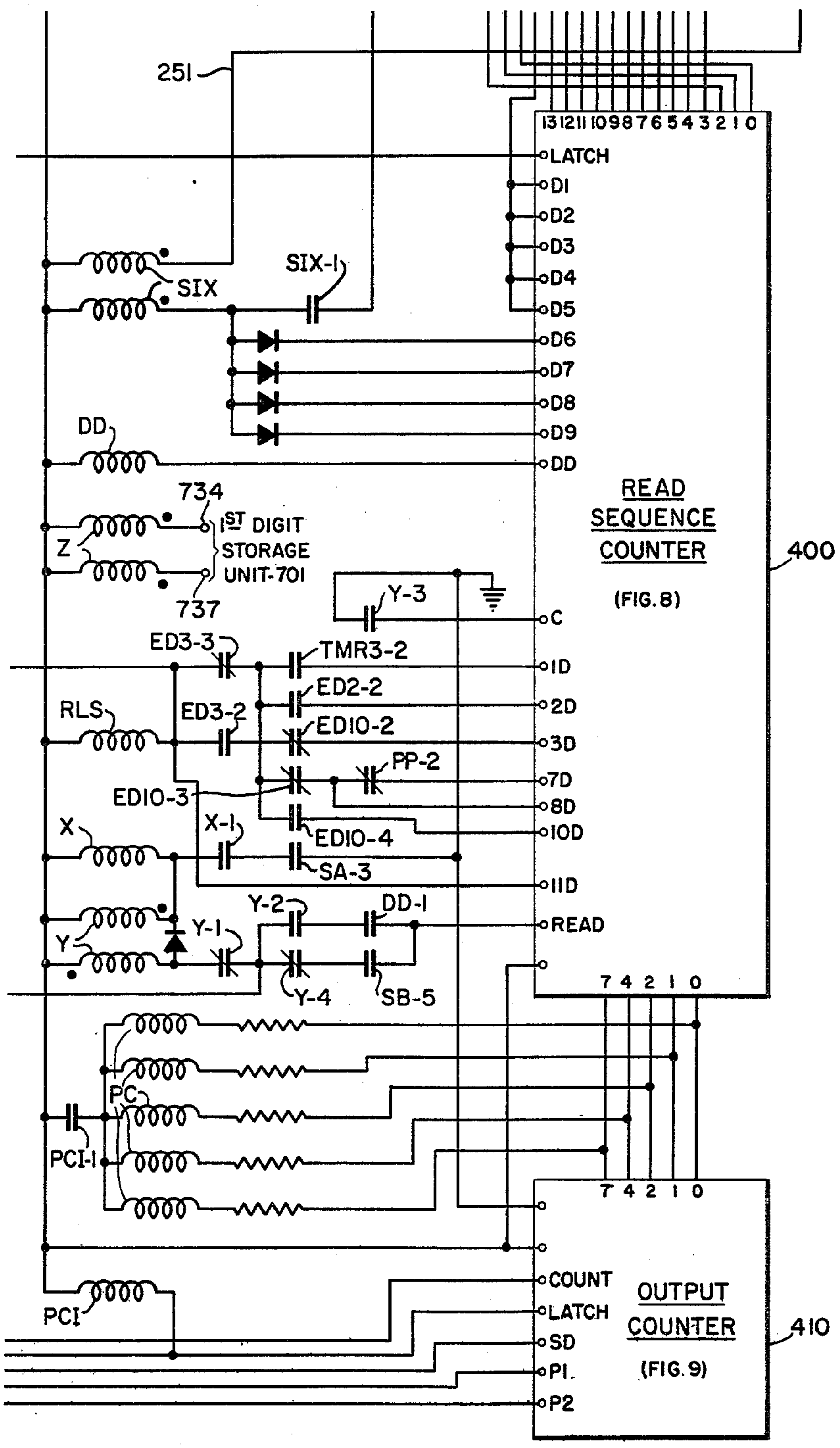
Figure 5:
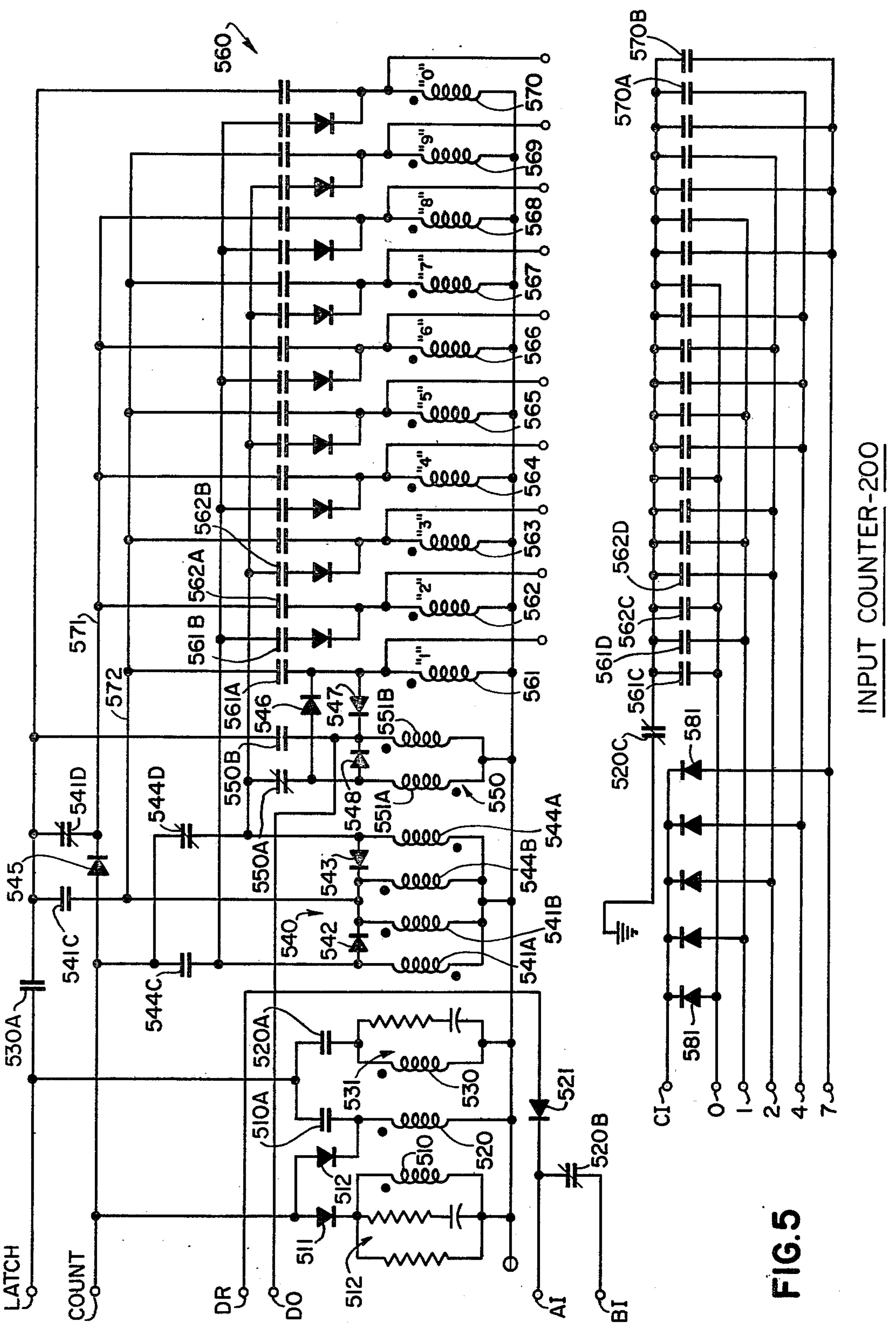
FIG. 5 is a schematic diagram of an input counter forming a part of the register sender.

As set forth above, a digit is not to be transmitted over the outgoing channel when the read sequence counter 400 advances to its second position in which the digit storage unit 714 is enabled. Further, as set forth above, to prevent an attempt to transmit a digit at this time, the first storage relay in the storage unit 712 is operated to apply ground to the terminal D1 (FIG. 8). Accordingly, when the relay 831 operates to close the contacts **831*b*, ground is applied to the terminal DD of the read sequence counter 400** (FIG. 4). This ground completes an obvious operating circuit for a delete digit relay DD.

In operating, the relay DD opens the normally closed contacts DD–2 to interrupt the operating circuit for the fourth timer TMR4 and closes a pair of normally open contacts DD–1. The closure of the contacts DD–1 prepares a circuit for supplying a ground pulse to the read terminal of the read sequence counter 400. Thus, when the pulsing relays P and PI are next operated and released to generate the next operating pulse, the closure and opening of the contacts P–1 forwards a ground pulse over the circuit including the closed contacts DS–7, SF–1, Y–2, and DD–1 to advance the read sequence counter 400 a single step. This operation of the pulsing relays P and PI does not result in the transmission of a pulse to the outgoing signaling channel because of the shunt provided by the closed contacts SF–5.

This read pulse applied to the counter 400 advances it to its third position in which the relay 832 is operated, and the relay 831 is released. Since the storage location 715 is also to be passed in the digit transmitting program, the terminal D2 supplies ground to the terminal DD when the relay 832 is operated, and the relay DD remains operated to direct the next pulse from the contacts P–1 to the read terminal of the read sequence counter. The relay 831 releases to remove ground from the terminal DD after the relay 832 operates to apply ground to the terminal DD from the terminal D2 so that the relay DD does not release as the counter 400 is advanced. Similar operations occur as the relays 833 and 834 are operated so that no transmission takes place under the control of the storage units 701 and 702.

When the read sequence counter 400 advances to its next setting in which the relay 835 is operated the digit "1" stored in the storage unit 703 is fed through the read sequence counter 400 to the output counter 410, and the relay DD is released to prevent further advance of the counter 400 without digit transmission and to start the timer TMR4. To prepare the register sender for transmitting the digit "1," it is necessary to wait a preset interdigital timing interval following the closure of the contacts DD–2 so that the timer TMR4 times out to open the normally closed contacts TMR4–1.

The opening of the contacts TMR4–1 interrupts the holding circuit for the relays SA and SB so that these relays release. The release of the relays SA and SB, in turn, causes the release of the relays X and Y. The release of the relay X causes the release of the relay SF which has remained operated from the conclusion of the transmission of the previous digit "9." The relays PC and PCI also are in a released condition because of the prior opening of the contacts Y–5 at the conclusion of the transmission of the digit "9." The relay SE is released as a result of the release of the relay SA. The release of the relay SF opens the contacts SF–4 in the operating circuit for the fourth timer TMR4 so that this timer restores to its normal condition and closes the contacts TMR4–1.

When the relay Y is released in the manner described above, the contacts Y–5 are again closed to operate the relay PCI. The operation of this relay again closes the contacts PCI–1 so that the parity check relay PC is enabled. If the digit "1" stored in the digit storage unit 703 is presented to the input of the output counter 410 in properly coded form, the relay PC again operates to close the contacts PC–1 to again operate the relay SE. The operation of the relay SE causes the transmission of the digit "1" stored in the digit storage unit 703 in the manner described above, and, incident to this transmission, the read sequence counter 400 is advanced a single step to release the relay 835 and to operate the relay 836. Thus, the thousands digit stored in the digit storage unit 704 is now presented to the input of the output counter 410.

The register sender remains in this condition until such time as the timer TMR4 is placed in operation by the operation of the SF relay at the conclusion of the transmission of the prior digit "1" in the manner described above and again operates to open the contacts TMR4–1. This releases the relay components described above and prepares the register sender to transmit the thousands digit received from the calling station 302.

This sequential operation continues until the last or units digit of the directory number stored in the storage unit 707 has been transmitted by the register sender. Incident to the termination of this transmitting operation, a ground pulse is applied to the read terminal of the read sequence counter 400 in the manner described above, and the counting circuit 800 (FIG. 8) releases the relay 839 and operates the relay 840. Since all of the digits required for this type of call have now been transmitted, the read sequence counter 400 advises the register sender that further transmitting operations are not required and causes the release of the register sender.

More specifically, the contacts Y–3 are closed incident to the operation of the Y relay at the termination of the read pulse which advanced the counter 400 to the setting in which the relay 840 is operated. When the relay 840 is operated, the contacts connected to the terminal 7D (FIG. 8) are closed to forward the ground supplied to the C terminal of the counter 400 by the closed contacts Y–3 over a circuit including the normally closed contacts PP–2, a pair of normally closed contacts ED10–3, and the normally closed contacts ED3–3 to operate the release relay RLS. The operation of the relay RLS restores the register sender to its normal condition in the manner described above. Thus, the read sequence counter 400 normally terminates transmitting operation when the counting circuit 800 in the counter 400 advances to a setting in which the relay 840 is operated.

As a further illustration of the operation of the register sender, it is assumed that the called station 308 is located in a tributary office designated by a seven digit directory number "64X–XXXX" and that the full seven digits are required for extending the connection from the calling station 302 to the called station 308 rather than the six digits required to reach the "991" office. In processing this call, the subscriber at the calling station 302 transmits the designation "64X–XXXX" which is stored in the data storage unit 240 in the storage locations 701–707 in the manner described above.

Incident to the storage of the third code digit in the storage unit 703, the relays C1 and C2 again place the routing director coder 230 in operation to translate the received digit "64X" and to return the necessary digital and instructional material to the register sender. Since the first digit to be transmitted over the outgoing signaling channel is assumed to be "6," although routing or code digits of other values could be supplied, the routing director coder 230 stores "6" in the storage unit 713. In the illustrative example, it is assumed that the outgoing signal switch train requires the same digits dialed by the subscriber, i.e., the remaining six digits "4X–XXXX." Since this information is stored in the storage locations 702–707, additional digital information from the routing director coder 230 is not required. However, additional control or instruction information is necessary.

In the first place, to obtain the proper output digit sequence, it is necessary to delete any transmission under the control of the storage units 714, 715, and 701. Accordingly, the first three storage relays in the delete digit storage unit 712 are operated to apply ground to the terminals D1, D2, and D3. This will cause the register sender to skip these three positions during the transmission cycle. Further, since seven digits rather than six digits are to be transmitted, the stop control controlled by the read sequence counter 400 must be modified. Accordingly, the routing director coder 230 forwards ground to the operating winding of the relay PP to operate this relay to close the contacts PP–3 and to open the contacts PP–1 and PP–2. The closure of the contacts PP–3 completes a holding circuit for the relay PP. The opening of the contacts PP–2 disconnects the terminal 7D of the read sequence counter 400 from the operating winding of the release relay RLS over the circuit described above. However, the terminal 8D is now connected to the winding of the release relay over the circuit including the closed contacts ED3–3 and ED10–3 so that the transmitting cycle of the read sequence counter 400 will be terminated following the transmission of the desired seven digits rather than six digits. After this instructional information is provided, the routing director coder 230 is released in the manner described above, and the read sequence counter 400 and the output counter 410 transmit the digits "64X–XXXX" in the manner described above under the control of the digits stored in the storage units 713 and 702–707. When the read sequence counter 400 advances to the position in which the relay 840 is released and the relay 841 is operated, the ground applied to the terminal C is applied to the terminal 8D, and the release relay RLS is operated to restore the register sender to its normal condition in the manner described above.

As a further example of this general type of operation, it is assumed that the called station 308 to which a communication path is to be extended from the calling station 302 is designated by a directory number "358–9573" which is transmitted by the calling station 302 and stored in the data storage unit 240 in the manner described above. However, to reach the called station 308 from the office in which the calling station 302 is located, the code digits "255" are required. One way in which this type of call can be handled by the register sender is to read the digits "358" stored in the storage units 701–703 into the routing director coder 230 in the manner described above. The routing director coder 230 then stores the necessary routing digits "2," "5," and "5" in the digit storage units 713–715, respectively. The routing director coder 230 also operates the relay PP in the manner described above so that the read sequence counter 400 is conditioned to transmit seven digits. The coder 230 also operates the last three relays in the storage unit 712 so that marking ground is applied to the terminals D3, D4 and D5. In this manner, during the transmitting cycle the output counter 410 transmits the digits "2," "5," and "5" stored in the storage units 713–715, skips the digits "3," "5," and "8" stored in the storage units 701–703, and transmits the digits "9," "5," "7," and "3" stored in the storage units 704–707.

As a further illustration of the operation of the register sender, it is assumed that the calling station 302 desires to make a toll call for which automatic toll ticketing facilities are required. In one form of call, the calling station 302 must transmit an access digit, such as "1" followed by seven or ten digits. With this type of call, the access digit "1" is stored in the storage unit 701 and the remaining seven or ten digits are stored in the storage units 702–708 or 702–711. When the first three digits stored in the storage units 701–703 are transmitted to the coder 230 in the manner described above, the access digit "1" is recognized, and the access digit required to obtain access to the toll ticketing equipment, such as a digit "8," is stored in the digit storage unit 713. Since all of the seven or ten dialed digits are required by the toll ticketing equipment, the routing director coder 230 operates the storage unit 712 to supply ground marking signals to the delete terminals D–1 and D–2 so that no digit transmission takes place under the control of the registers 714 and 715. If a seven digit number is stored, no additional instructions are required, and the readout sequence is terminated by the ground signal supplied by the terminal 7D of the read sequence counter 400 (FIG. 4) when the relay 840 (FIG. 8) is operated following the transmission of the access digit "8" and the seven digits supplied by the calling station 302.

On the other hand, if an area code is provided so that the call comprises the access digit "8" followed by ten digits, the transmitting cycle of the read sequence counter 400 and the output counter 410 should not be terminated until ten digits have been transmitted. Accordingly, the routing director coder 230 supplies ground to the operating winding of a relay ED10 (FIG. 1) to operate this relay. The operation of the relay ED10 opens the contacts ED10–2 and ED10–3 and closes the contacts ED10–1 and ED10–4. The closure of the contacts ED10–1 provides a holding circuit for the relay ED10. The opening of the contacts ED10–2 and ED10–3 prevents operation of the release relay RLS when ground is supplied to the output terminals 3D, 7D, and 8D of the read sequence counter 400. The closure of the contacts ED10–4 connects the output terminal 10D from the read sequence counter 400 to the winding of the release relay RLS through the normally closed contacts ED3–3. Thus, the release relay RLS is operated during the transmitting cycle only after the access digit and ten additional digits have been transmitted. The operation of the release relay RLS restores the register sender to its normal condition in the manner described above and, in removing ground from the closed contacts ED10–1, releases the relay ED10.

The same type of operation of the register sender can be used when a call requires a different type of toll ticketing facility which is accessed by a different access digit. As an example, the subscriber at the calling station 302 can prefix the seven or ten digit number for the toll call with an access digit "0" which is recognized by the routing director coder 230 by supplying a different initial digit, such as "5," to the storage unit 713. This first digit to be transmitted by the register sender directs the remaining seven or ten digit number to the facilities accessed by the preliminary digit "5." Further, the toll ticketing facilities can be accessed without the use of a prefix such as "1" or "0" by providing translating facilities in the routing director coder 230 which determines the need for toll ticketing facilities by an examination of the three code digits supplied by the digit storage units 701–703. The access digit for reaching the toll ticketing facilities can then be supplied by the coder 230 and stored in the digit storage unit 713.

An additional type of call from the calling station 302 is a call to such auxiliary equipment as a time machine or other recorded message units. If access to the time machine is obtained by transmitting the designation "114" from the station 302 and access to the time machine is obtained, for instance, by the switch directing digits "44," the three transmitted digits "114" are stored in the digit storage units 701–703 in the manner described above and subsequently transferred to the input of the director coder 230 in the manner described above. One manner of handling this type of call is to store the first digit "4" of the time machine selecting digits "44" in the unit 713 and to store digit delete instructions in the unit 712 to supply ground marking signals to the terminals D1, D2, D3, and D4. This will cause the read sequence counter 400 and the output counter 410 to transmit the "4" stored in the storage unit 713, to pass the storage units 714, 715, 701, and 702, and to transmit the "4" stored in the digit storage unit 703.

In this operation, it is necessary to stop the transmitting operation as soon as the digit "4" stored in the digit storage unit 703 has been transmitted, i.e., at the time when the relay 835 (FIG. 8) is released and the relay 836 is operated. Accordingly, the routing director coder 230 supplies ground to the winding of a relay ED3 (FIG. 1) to operate this relay to open the contacts ED3–3 and to close two pairs of normally open contacts ED3–1 and ED3–2. The closure of the contacts ED3–1 completes a holding circuit for the relay ED3. The closure of the contacts ED3–2 connects the winding of the release relay to the output terminal 3D from the read sequence counter 400 so that ground is supplied to operate the release relay RLS when the relay 836 (FIG. 8) is operated. The opening of the contacts ED3–3 prevents operation of the release relay RLS when ground is applied to either of the output terminals 1D or 2D (FIG. 4). Accordingly, during the following cycle of transmitting operation of the register sender, the digit "4" stored in the unit 713 is transmitted, the storage units 714, 715, 701, and 702 are passed, the digit "4" stored in the digit storage unit 703 is transmitted, and the register sender is released when the counter 400 is advanced to its next step.

As a further example of this same general type of operation, access to service trunks in the office are obtained by dialing a designation such as, for instance, "117," and these same three digits are required at the output of the register sender to select the desired service trunk. In carrying out this type of operation, the transmitted digits "117" are stored in the storage units 701–703 in the manner described above and transferred to the routing director coder 230. The director coder 230 then stores the initial digit "1" in the storage unit 713. The coder 230 also operates the first three relays in the storage unit 712 so that ground is supplied to the output terminals D1 to D3 to prevent the transmission of any information under the control of the digit storage units 714, 715, and 701. In addition, transmission is to be terminated following the transmission of the digit stored in the storage unit 703, and the relay ED3 is again operated to render only the output terminal 3D in the read sequence counter 400 effective to operate the release relay. Thus during the outpulsing cycle, the digit "1" stored in the digit storage unit 713 is transmitted, and the digit storage units 714, 715, and 701 are passed because of the ground signals applied to the terminals D1, D2, and D3. The digits "1" and "7" stored in the storage units 702 and 703 are then transmitted, and the operation of the relay 836 in the read sequence counter 400 (FIG. 8) supplies ground from the terminal C to the terminal 3D to operate the release relay RLS.

A different type of call that can be handled by the register sender is a call between the stations 302 and 308 when these two stations are located in the same local office, but a translation is required between directory number and equipment number. As an example, assuming that the directory number of the called station 308 is "225–5121" and that the called station 308 is reached by the four digit designation "3314," the seven digits "225–5121" are transmitted to and stored in the data storage unit 240 in the manner described above. When the three code digits "225" have been stored in the units 701–703, the relays C1 and C2 are again operated to transmit these three code digits to the routing director coder 230.

When the coder 230 receives the digits "225," it recognizes that this is a local call requiring number group translation and the use of the number group translator coder 250. Accordingly, the director coder 230 does not store data in any of the units 713–715 and operates all of the relays in the storage unit 712 so that ground marking signals are applied to all of the terminals D1 to D5 to prevent any transmission of digits under the control of the storage units 714, 715, and 701–703. In addition, the routing director coder 230 again operates the relay ED10 to condition the read sequence counter 400 to operate the release relay RLS when ground is applied to the output terminal 10D. It is necessary to release the counter 400 at this time even though only four digits are being transmitted because the last three digits to be transmitted are to be stored in the storage units 708, 709, and 710, as described below. The routing director coder 230 also delivers a signal at this time indicating that the routing director coder 230 is no longer required and providing an indication that the number group coder 250 will be required for number group translation as soon as the remaining four digits of the directory number have been received and stored in the storage unit 240.

To accomplish this, the routing director coder 230 supplies ground over a conductor 232 to energize both of the windings of the relay C1, both of the windings of a relay NG2, and the single winding of a relay NG1. Since both of the oppositely poled windings of the relay NG2 are energized, the contacts of the relay NG2 are not actuated. However, the contacts of the relay NG1 are operated to close a pair of normally open contacts NG1–1. The closure of the contacts NG1–1 completes a holding circuit for maintaining the relay NG1 operated and for energizing one of the windings of the relay NG2. The concurrent energization of both of the windings of the relay C1 results in the production of a magnetic field of inappreciable magnitude, and the reed switches forming a part of the relay C1 are restored to their normal condition. This releases the relay C2 and removes start ground from the busy test circuit 150. The release of the relay C2 removes the operating ground from the switching relays in the coder 230 to release this coder. Incident to this, the ground supplied to the conductor 232 is removed so that only one of the windings of the relay NG2 are energized, and this relay is operated.

More specifically, the operation of the relay NG2 closes two pairs of contacts NG2–1 and NG2–3 and opens the contacts NG2–2. The opening of the contacts NG2–2 prevents seizure of the coder 230. The closure of the contacts NG2–1 connects one winding of the relay C1 to the terminal CW–7 in the write sequence counter 220. The closure of the contacts NG2–3 prepares a circuit for connecting the number group translator coder 250 to the data storage unit 240.

The last four digits "5121" of the directory number of the called station 308 are now stored in the storage units 703–707 in the manner described above. Incident to the storage of the last digit "1" in the storage unit 707, ground is applied to the terminal CW–7 of the write sequence counter 220 which is forwarded over the closed contacts NG2–1 to operate the relay C1. The operation of the relay C1 returns start ground to the busy test circuit 150 which checks on the idle or busy condition of the coder 230 and the NGT coder 250. If these units are idle and available for use, the busy test circuit again operates the relay C2 so that this relay is operated to close the contacts C2–2, among others. The closure of the contacts C2–2 forwards ground through the closed contacts NG2–3 so that the NGT coder 250 is seized.

This ground operates input switching means for the coder 250 so that the outputs of the digit storage units 704–707 are connected to the input of the coder 250. The switching means also connects the output of the coder 250 to the input of the storage units 713 and 708–710. The NGT coder 250 now translates the directory number "5121" received from the data storage unit 240 to the equipment number "3314" comprising the hundreds digit "3," the tens digit "3," units digit "1," and party code "4" and stores the hundreds digit "3" in the storage unit 713, the tens digit "3" in the storage unit 708, the units digit "1" in the storage unit 709, and the party digit "4" in the storage unit 710.

Since only the equipment number "3314" is to be used in place of the directory number "5121," means must be provided for deleting the transmission of data stored in the units 704–707. Accordingly, the NGT coder 250 supplies ground over a conductor 251 to energize one winding of a relay SIX. In operating, the relay SIX closes a pair of normally open contacts SIX–1 to complete a holding circuit for the other winding of the relay SIX. The ground supplied through the closed contacts SIX–1 is also forwarded over four diodes to four terminals D6, D7, D8, and D9. As shown in FIG. 8, the application of ground to the terminals D6, D7, D8, and D9 causes ground to be applied to the output terminal DD when the output steering relays 836–839 are operated. Thus, during the transmitting cycle, digits are not transmitted under the control of the digit storage units 704–707 in which are stored the directory numbers "5121."

When the necessary information has been transferred from the NGT coder 250 to the data storage unit 240 and to the relay SIX, the presence of the hundreds code digit in the storage unit 713 again initiates the transmitting cycle by operating the relays SE and DS. The operation of the relay DS releases the relays C1, C2, NG1, and NG2 and restores the routing director 230 and the NGT coder 250 to an idle condition in which they can be used in processing other calls. The read sequence counter 400 and the output counter 410 now transmit the digit "3" stored in the unit 713 and passes the storage units 714, 715, and 701–707. These components then transmit the digits "3," "1," and "4" stored in the digit storage units 708, 709, and 710, respectively. After the transmission of the last digit "4," the read sequence counter 400 is advanced to operate the relay 843 and to release the relay 842 (FIG. 8). The operation of the relay 843 supplies ground from the terminal C to the terminal 10D to operate the release relay RLS in the manner described above and thus release the register sender.

The register sender also includes means for automatically directing permanent seizures to trouble trunks, such as trunks extending to a hospital. This operation is controlled by the first timer TMR1. As described above, the first timer TMR1 is placed in operation over the circuit including the normally closed contacts DS–2 and INT–1 as soon as the register sender is seized and the contacts H–1 or B–7 are closed. The contacts DS–2 are opened during outpulsing operations, and the contacts INT–1 are opened by the receipt of information from the calling station 302. However, in the event that the register sender is seized and digital information is not received, the timer TMR1 times out after an interval of around eight to fifteen seconds.

When the timer TMR1 times out, three pairs of normally open contacts TMR1–1 to TMR1–3 are closed. The closure of the contacts TMR1–1 operates the dial tone relay DT so that dial tone is removed from the connection in the manner described above. The closure of the contacts TMR1–2 initiates the operation of the second timer TMR2. The closure of the contacts TMR1–3 applies ground to a terminal 160 (FIG. 1) which is connected to the similarly numbered terminal 160 in FIG. 7 to operate two storage relays in the data storage unit 713 having the weights "0" and "7" to provide a 2 of 5 coded representation of the access digit "7" used to reach the trouble trunks.

The closure of the contacts TMR1–1 also forwards ground to the operating winding of a voice relay V to operate this relay. In operating, the relay V closes a plurality of contacts V–3 to V–5 and opens the contacts V–1 and V–2. The closure of the contacts V–3 completes a holding circuit for the relay V. The opening of the contacts V–1 removes ground from the input terminal BI to the input counter 200 and thus removes ground from the output terminal AI from this counter. If the register sender received a class of service mark on the wiper 311 on seizure so that the tone receiver 210 is associated with the receiver to provide means for receiving the transmitted digits, which digits have not been received, the removal of ground from the terminal AI opens the holding circuit for the relay TT so that this relay and the relays controlled thereby are released in the manner described above. This interrupts the association between the register sender and the tone receiver 210 and frees the tone receiver 210 for use with other register senders. The opening of the contacts V–2 interrupts the above-described circuit for supplying ground pulses to the count terminal of the input counter 200 and thus prevents operation of the counter in the event that dial pulses are received following the timing out of the first timer TMR1.

The closure of the contacts V–4 applies a start ground to a message recorder or voice signal source 370, and the closure of the contacts V–5 connects the voice signal source 370 to the ring conductor of the switch train and returns a recorded message to the calling station 302. This message can, for instance, audiby advise the subscriber at the calling station 302 that the call cannot be completed and must be reinitiated. Alternatively, the message provided by the recorder 370 can advise the subscriber at the calling station 302 that the call is being routed to a particular destination.

As described above, the digit "7" for obtaining access to the trouble trunks has been stored in the storage unit 713 and is thus forwarded through the read sequence counter 400 to the input of the output counter 410. The storage of this digit in the storage unit 713 also operates the parity check relay PC to close the contacts PC–1 so that the relay SE is again operated. However, an outpulsing operation is not initiated because the relay DS remains in a released condition. This permits the subscriber at the calling station 302 to go "on-hook" and terminate the attempted call. Alternatively, if the call is maintained at the calling station 302 for a sufficient period of time, the second timer TMR2 times out and closes three pairs of normally open contacts TMR2–1 to TMR2–3. The closure of the contacts TMR2–3 completes a holding circuit for the timer TMR2. The closure of the contacts TMR2–2 prepares an operating circuit for the release relay RLS, which circuit is interrupted by the open contacts SE–1.

The closure of the contacts TMR2–1 forwards ground to the operating winding of the relay DS so that this relay operates. When the relay DS is operated to open the contacts DS–2, the operating circuit for the first timer TMR1 is interrupted, and the contacts controlled thereby are restored to their normal condition. The second timer TMR2, however, is not released because of the holding circuit for this timer completed through the closed contacts TMR2–3. The relays DS and SE now being operated, the output counter 410 transmits the digit "7" to the outgoing switch train, and the call is automatically extended to an idle trunk in the trouble trunk group. Incident to the conclusion of the transmission of the single digit "7," the read sequence counter 400 (FIG. 8) is advanced to a setting in which the relay 830 is released and the relay 831 is operated to close the contacts 831A. Thus, ground is applied to the terminal 1D. However, the timer contacts TMR3–2 are not closed, and this advance of the read sequence counter 400 is not effective to operate the release relay RLS.

Thus, the register sender remains in the connection between the calling station 302 and the trouble trunk until the interdigital timer TMR4 times out and opens the contacts TMR4–1. This releases the relay SA which, in turn, causes the release of the relay SE as well as the resetting operations described above. The release of the relay SE closes the contacts SE–1 so that ground is forwarded through the contacts TMR2–2 to operate the release relay RLS. The operation of the release relay removes the register sender from the connection, and the calling station 302 remains connected to the selected trunk in the trouble trunk group through the adapter 301 and a subsequent switch train 306.

The illustrated register sender also includes means for automatically terminating the transmission of digits whenever the continuity of the outgoing circuit is interrupted. More specifically, if the continuity of the outgoing circuit over the wipers 315 and 316 is interrupted during the transmission of a digit, the operation of the register sender will not be affected. At the end of the digit transmission, however, when the lower winding of the relay SX is connected across the outgoing line, this winding will not be energized, and the relay SX will be maintained operated only over the holding circuit including the upper winding and the normally closed contacts Y–5 and the closed contacts SX–1.

As described above, the relay Y is operated at the end of the read pulse applied to the read sequence counter 400, and the contacts Y–5 are then opened. This terminates the energization of the upper winding of the relay SX and causes this relay to release to close the contacts SX–3 and to open the contacts SX–1 and SX–2. The register sender remains in this condition during the interval controlled by the timer TMR4 providing the interdigital delay, and, at the end of this period, causes the sequential release of the relays X, Y, SF, SA, and SB. The release of the relay Y closes the contacts Y–5 so that the relay PCI is again operated to enable the parity check relay PC. Assuming that the next digit to be transmitted is supplied in proper form to the input of the output counter 410, the contacts PC–1 are again closed to operate the relay SE. However, the closure of the contacts SE–3 does not energize the windings of the relays SA and SB because the contacts SX–2 are now in an open state. Thus, the transmission of the next digit cannot be initiated so long as the outgoing switch train is not in a proper condition to receive switch directing signals.

The operation of the relay SE to close the contacts SE–4 coupled with the prior release of the relay SX to close the contacts SX–3 completes an operating circuit for the first timer TMR1. If the outgoing circuit remains in an inoperative state for the timing interval of the timer TMR1, this timer again operates to close the contacts TMR1–1 to TMR1–3. The closure of the contacts TMR1–2 again starts the operation of the second timer TMR2. The closure of the contacts TMR1–1 operates the voice relay V so that, as described above, a recorded message is supplied from the source 370 to the calling station 302 to advise a subscriber that the requested connection cannot be made. If the connection is released by the subscriber at the calling station 302 at this time, the register sender is restored to its normal condition in the manner described above.

Alternatively, if the attempted connection is maintained for the timing interval of the second timer TMR2, this timer is operated to actuate its contacts. The closure of the contacts TMR2–3 completes a holding circuit for the second timer TMR2, and the closure of the contacts TMR2–2 completes a circuit extending through the closed contacts SE–4, SX–3, and DS–1 for operating the release relay RLS. The operation of the release relay RLS restores the register sender to its normal condition in the manner described above.

The closure of the contacts TMR1–3 supplies ground marking to the digit storage unit 713, but this marking results in unintelligible information being stored in the unit 713 because of the prior storage of a digit in this unit during prior operation. However, the garbled storage in the unit 713 does not affect the operation of the register unit because the detection of the open circuit condition in the outgoing signal path which caused the release of the relay SX is not effective to produce the operations described above until at least one digit has been transmitted, and the digit stored in the unit 713 is always the first digit transmitted.

If the outgoing signaling path returns to a proper state for receiving digit transmission prior to the timing out of the second timer TMR2, the lower winding of the relay SX is again energized to open the contacts SX–3 and to close the contacts SX–1 and SX–2. The opening of the contacts SX–3 interrupts the operating circuit for the first timer TMR1 so that this timer restores to its normal condition and opens its contacts to stop the operation of the second timer TMR2 and to release the voice relay V. The closure of the contacts SX–2 and SX–1 permits the resumption of digit transmission in the manner described above.

If the nature of the routing information provided by the coder 230 is such that transmission should be terminated after the contents of the digit storage unit 702 have been examined, i.e., following an examination of the digit storage units 713–715, 701, and 702, a control relay ED2 is provided which is operated by the routing director coder 230. The operation of the relay ED2 closes two pairs of normally open contacts ED2–1 and ED2–2. The closure of the contacts ED2–1 provides a holding circuit for the relay ED2. The contacts ED2–2 connect the output terminal 2D of the read sequence counter 400 through the normally closed contacts ED3–3 to the operating winding of the release relay RLS. Thus, the register sender can be released when the relay 835 (FIG. 8) is operated following the examination of the contents of the digit storage unit 702.

The timer TMR1 can be disabled by opening the contacts 324 in the operating circuit for this timer. Further, the register sender can be released by operating a switch to close a pair of normally open contacts 326. The closure of the contacts 326 applies ground directly to the winding of the release relay RLS and can be used to effect manual release of the register sender.

The register sender also includes the usual busy key 320 including the normally closed contacts 322 and two pairs of normally open contacts 321 and 323. When the busy key 320 is operated, the closure of the contacts 321 applies ground to the bank contact engaged by the wiper 108 which is individual to the illustrated register sender. As described above, the presence of direct ground on this contact marks the illustrated register sender as busy in the bank of the switch 102 and prevents seizure or assignment of this register sender by the register assigner 100. The opening of the contacts 322 when the busy key 320 is operated disconnects the winding of the relay ARB from the source of ground provided by the normally closed contacts B–1 and MB–2. This removal of ground provides an indication to the register assigner 100 that the illustrated register sender is not available for assignment. The closure of the contacts 323 forwards the ground provided by the normally closed contacts B–1 and MB–2 through a pair of diodes which supply latching ground and switched main ground for the register sender in place of that normally supplied by the contacts CT–7 and CT–1 which are closed when the register sender is seized. This permits testing of the register sender and the data handling components thereof without requiring association of the register sender with an adapter circuit 301.

The register assigner 100 also includes circuitry for preventing the stepping switch 102 therein from becoming permanently associated with a given one of the register senders to which this switch has access. To accomplish this, the register assigner 100 includes a slow-to-release relay R which is connected to negative battery through the closed contacts A–1, the interrupter contacts 106, and the winding of the motor magnet 104. The operation of the relay R closes a pair of contacts R–1 to connect the winding of a reset relay RS to ground. The relay RS has a six second delay in operating. Accordingly, if the relay R is maintained operated for more than six seconds, the relay RS operates to close a pair of normally open contacts RS–1. This connects ground directly to the winding of the motor magnet 104 and operates the stepping switch 102 a single step. The relays R and RS are released when the contacts A–1 are opened. The release of the relay A signifies that the demand of an adapter circuit for an idle register sender has been fufilled.

Although the present invention has been described with reference to a single illustrative embodiment thereof, it should be understood that numerous other modifications and embodiments can be devised by those skilled in the art that will fall within the spirit and scope of the claims of the present invention.

What is claimed and desired to be secured by Letters Patent of the United States is:

1. In a communication system of the type having a signaling channel to which digit representing dial or tone signals are applied from calling stations, register means for storing digits received from the channel, dial signal responsive means connected to the register means for controlling the storage of digits in the register means, first switching means connected to the dial signal responsive means and operable to connect the dial signal responsive means to the channel to control the storage of digits in the register means, tone signal responsive means for controlling the storage of digits in the register means, second switching means, and control circuit means connected to the channel by the first switching means for selectively operating the second switching means to connect the tone signal responsive means between the channel and the register means when tone signals are used so that the tone signal responsive means is effective to control the storage of digits in the register means.

2. In a communication system of the type having a signaling channel to which digit representing dial or tone signals are applied from calling stations, register means for storing digits received from the channel, dial signal responsive means for controlling the storage of digits in the register means, tone signal responsive means for controlling the storage of digits in the register means, first control circuit means connected to the dial signal responsive means and the tone signal responsive means and operable to selectively render either the dial signal responsive means or the tone signal responsive means effective to control the storage of digits in the register means under the control of signals received from the signaling channel, said first control circuit means being operable to a first conditon in which the dial signal responsive means is rendered effective to control the storage of digits in the register means and the tone signal responsive means is ineffective to control the storage of digits in the register means, said first control circuit means being operable to a second condition to render the tone signal responsive means effective to control the storage of digits in the register means, and second control circuit means coupled to the signaling channel and responsive to the receipt of dial signals from the signaling channel when the first control circuit means is in its second condition for operating the first control circuit to its first condition.

3. The communication system set forth in claim 2 in which the register means is connected to the digit signal responsive means and in which the first control circuit means includes both a first switching means operated when the first control circuit means is in its first condition to connect the dial signal responsive means and the register means to the signaling channel and a second switching means operated when the first control circuit means is in its second condition to connect the tone signal responsive means between the channel and the register means.

4. The communication system set forth in claim 2 including circuit means connecting the register means to the dial signal responsive means, first switching means controlled by the first control circuit means in its first condition for connecting the dial signal responsive means to the signaling channel, and second switching means controlled by the first control circuit means in its second condition for connecting the register means to the signaling channel through the first switching means.

5. The communication system set forth in claim 4 in which the second control circuit means includes means operated by the receipt of a dial signal from the signaling channel for releasing the second switching means.

6. A communication system of the type having a calling line to which digit representing signals are applied for all types of calls extended by the system comprising a register means including a plurality of digit storing stages, signal responsive means, means for coupling the signal responsive means to the calling line to receive successive digits from the line for all of said types of calls, input steering means connected between the register means and signal responsive means for storing successive digits received from said line in a first group of the stages of the register means in a first predetermined and fixed order of stages, translating means controlled by the digits stored in a given group of the stages of the register means, said translating means including means for always storing at least one additional digit in a stage of the register means that is not included in said first group of stages, signal transmitting means for transmitting digit representing signals, and output steering means connected between the register means and the signal transmitting means for rendering the stages of the register means effective to control the signal transmitting means in a second predetermined order of stages which is different from said first order of stages and in which the stage containing said additional digit is the first stage rendered effective in the second predetermined order.

7. A communication system of the type having a calling line to which are applied a series of digit representing signals indeterminate in number but not exceeding a given known number, comprising signal responsive means for receiving each signal in the series of digit representing signals, register means having a plurality of separate stages for storing digits, the number of said stages being greater than said known number, input steering means connected between the signal responsive means and the register means for storing received digits in a first group of said stages in a first order of stages, translating means controlled by at least one of the stages in said first group, said translating means including means for always storing at least one additional digit in a stage of the register means that is not included in the first group of stages, signal sending means for transmitting variable numbers of digit representing signals, output steering means for sequentially rendering different ones of the stages in the register means effective to control the signal sending means in a second order of stages different from the first order of stages, the second order always including the stage containing the additional digit as the first stage of the second order, and control means controlled by the translating means for placing different combinations of the stages other than the stage containing the additional digit in the second order of stages rendered effective by the output steering means.

8. A communication system of the type having a signaling channel to which a variable number of digit representing signals corresponding to a variable number of digits are applied comprising register means including first, second, and third groups of digit storing stages; input means coupled to the channel and responsive to digit representing signals for storing digits received from the channel in the second group of stages; first translating means controlled by at least one of the stages in the second group for storing at least one digit in a stage of the first group; second translating means controlled by at least one of the stages of the second group for storing at least one digit in a stage of the third group; signaling means for providing digit representing signals; and output steering means connected between the signaling means and the register means for sequentially coupling the signaling means to the stages in the first, the second, and the third groups in that sequence.

9. The communication system set forth in claim 8 including control storage means controlled by the first translating means for inhibiting control of the signaling means by certain ones of the stages in the first and second groups selected by the first translating means.

10. The communication system set forth in claim 8 including control storage means controlled by the second translating means for inhibiting control of the signaling means by certain ones of the stages in the second group selected by the second translating means.

11. A communication system of the type having a signaling channel to which a variable number of digit representing signals corresponding to a variable number of digits are applied comprising register means including first, second, and third groups of digit storing stages; input means coupled to the channel and responsive to digit representing signals for storing digits received from the channel in the second group of stages; a first translating means; first means controlled by the storage of a given number of digits in the stages of the second group for connecting the first translating means between a selected number of the stages in the second group of the stages and the first group of stages to store at least one digit in one of the stages in the first group; second translating means; second means controlled by the storage of a number of digits in the stages of the second group that is larger than said given number for connecting the second translating means between a number of the stages in the second group and the stages in the third group to store at least one digit in one of the stages in the third group; signaling means for sending digit representing signals; and output steering means connected between the register means and the signaling means for sequentially coupling the sending means to the stages of the register means.

12. In a communication system of the type having a signaling channel to which digit representing signals are applied, register means having a plurality of digit storing stages, signal responsive input means coupled between the channel and the register means for storing digits received from the channel in a first group of the stages, translating means controlled by a digit stored in at least one of the stages in the first group for storing a digit in an additional one of the stages in said register means that is not included in the first group, sending means controlled by the register means for transmitting digit representing signals in sequence in accordance with the digits stored in the register means and always including the digit stored in said additional one of the stages, and detecting means responsive to the value of the digit stored in a given one of the stages of the first group for storing a digit of a known and fixed value in said additional one of the stages in place of digits supplied by the translating means.

13. The system set forth in claim 12 including start means for placing the sending means in operation, and means controlled by the storage of a digit in said additional stage for operating the start means.

14. In a communication system of the type having a signaling channel to which digit representing signals are applied, register means having a plurality of digit storing stages, signal responsive input means coupled between the channel and the register means for storing digits received from the channel in a first group of the stages, translating means controlled by the digit stored in at least one of the stages in the first group for storing a digit in an additional one of the stages in said register means that is not included in the first group, sending means controlled by the register means for transmitting digit representing signals in sequence in accordance with the digits stored in the register means, start means responsive to the storage of a digit in said additional one of the stages for placing the sending means in operation, and detecting means responsive to the value of the digit stored in a given one of the stages of the first group for storing a digit of a known and fixed value in said additional one of the stages in place of digits supplied by the translating means.

15. In a communication system of the type having a signaling channel to which digit representing signals are applied, register means having a plurality of digit storing stages, switching means for connecting the channel and the register means so that the register means stores digit received from the channel, sending means controlled by the register means for transmitting digit representing signals in sequence in accordance with the digits stored in the register means, start means for placing the sending means in operation and responsive to the storage of a digit in a predetermined one of the stages, release means for releasing the switching means and operated by the sending means after at least one digit has been transmitted, and detecting means responsive to the absence of digits from the channel following the operation of the switching means for storing a digit in the predetermined one of the stages.

16. In a communication system of the type having a signaling channel to which digit representing signals are applied, register means having a plurality of digit storing stages, signal responsive input means coupled between the channel and the register means for storing digits received from the channel in a first group of the stages, translating means controlled by at least one digit stored in the register means for storing at least one additional digit in an additional one of the stages in the register means that is not included in the first group, first control means controlled by the storage of digits in the register means for coupling the translating means to the register means, sending means controlled by the register means for transmitting digit representing signals in sequence under the control of the digits stored in the register means, detecting means responsive to the storage of a digit of a given value in a given one of the stages of the first group, second control means controlled by the detecting means for storing a digit in said additional one of the stages and for preventing operation of the first control means, and third control means responsive to the receipt of a digit from the channel subsequent to the detection of the storage of the digit of given value for preventing operation of the second control means.

17. In a communication system of the type having a signaling channel to which digit representing signals are applied, register means having a plurality of digit storing stages, signal responsive input means coupled between the channel and the register means for storing digits received from the channel in a first group of the stages, sending means controlled by the register means for transmitting digital signals in sequence in accordance with the digits stored in the register means, digital signal controlled switching means connected to the sending means for extending a circuit, and circuit continuity detecting means connected to the sending means and the switching means for arresting operation of the sending means whenever continuity of the circuit is interrupted.

18. In a communication system of the type having a signaling channel to which digit representing signals are applied, register means having a plurality of digit storing stages, signal responsive input means coupled between the channel and the register means for storing digits received from the channel in a first group of the stages, said digits being stored in an N-of-M coded form where M is the number of bit positions in the code and N is a value more than one and less than M and represents the number of bits present in a valid code, a group of M marking conductors connected to the register means and selectively energized in accordance with the N-of-M code, sending means connected to the marking conductors for transmitting digit representing signals in sequence under the control of the register means, said sending means including a counting circuit operable to different settings representing different digits, stop means for arresting operation of the sending means, said stop means including N windings and a magnetic switch which is operated by concurrent energization of the N windings and which is not operated by energization of less than N windings, and means including the counting circuit for rendering different combinations of N marking conductors effective to control the energization of the N windings in different settings of the counting circuit.

19. In a telephone system providing various types and classes of service and service features such as local, toll, extended area, and informational service and having a calling line to which digit representing signals are applied, a register-sender including a plurality of digit storing stages, means for coupling the register-sender to the calling line each time that a calling condition exists on the line regardless of the type or class of service required, input storing means coupled to the digit storing stages for storing digits received from the line in a first group of the digit storing stages, a control and digit translating network controlled by at least some of the digits stored in the first group of digit storing stages, said control and digit translating network including means for always storing at least one additional digit in a digit storing stage of the register-sender that is not included in said first group of digit storing stages, signal sending means in said register-sender for transmitting digit representing signals, and output steering means coupled to the digit storing stages of the register-sender and the signal sending means for rendering the digit storing stages effective to control the signal sending means in a sequence which always includes the stage in which said additional digit is stored as the first stage in the sequence so that the signal sending means in the register-sender always transmits the additional digit as the first transmitted digit on calls of all of the classes and types of service.

References Cited

UNITED STATES PATENTS

| | | |
|---|---|---|
| 2,723,312 | 11/1955 | McGuigan et al. |
| 3,151,220 | 9/1964 | Arnold et al. |
| 3,159,716 | 12/1964 | Riddell et al. |
| 3,259,697 | 7/1966 | Brumfield et al. |
| 3,328,530 | 6/1967 | Schildgen et al. |

KATHLEEN H. CLAFFY, Primary Examiner

THOMAS W. BROWN, Assistant Examiner